(12) United States Patent
Valdes Simancas

(10) Patent No.: US 9,969,634 B2
(45) Date of Patent: May 15, 2018

(54) HIGH-CAPACITY BIOLOGICAL CONTACT ROTOR

(71) Applicant: Francisco Xavier Valdes Simancas, Jalisco (MX)

(72) Inventor: Francisco Xavier Valdes Simancas, Jalisco (MX)

( * ) Notice: Subject to any disclaimer, the term of this patent is extended or adjusted under 35 U.S.C. 154(b) by 601 days.

(21) Appl. No.: 14/370,439

(22) PCT Filed: Dec. 19, 2012

(86) PCT No.: PCT/MX2012/000137
§ 371 (c)(1),
(2) Date: Oct. 6, 2014

(87) PCT Pub. No.: WO2013/103289
PCT Pub. Date: Jul. 11, 2013

(65) Prior Publication Data
US 2015/0068960 A1    Mar. 12, 2015

(30) Foreign Application Priority Data

Jan. 3, 2012 (MX) .................... MX/a/2012/000207
Jan. 3, 2012 (MX) .................... MX/a/2012/000208
Nov. 26, 2012 (MX) .................... MX/a/2012/013686

(51) Int. Cl.
*C02F 3/08* (2006.01)
*C02F 101/30* (2006.01)

(52) U.S. Cl.
CPC .......... *C02F 3/082* (2013.01); *C02F 2101/30* (2013.01); *C02F 2203/006* (2013.01); *Y02W 10/15* (2015.05)

(58) Field of Classification Search
CPC ................................ C02F 3/082; C02F 3/101
(Continued)

(56) References Cited

U.S. PATENT DOCUMENTS 1,811,181 A    6/1931 Maltby
1,947,777 A    2/1934 Huff et al.
(Continued)

FOREIGN PATENT DOCUMENTS

EP    0165730    12/1985
EP    0366477    5/1990
(Continued)

OTHER PUBLICATIONS

International Search Report for PCT/MX2012/000137, English translation attached to original, Both completed by the Mexican Patent Office dated May 27, 2013, All together 6 Pages.
(Continued)

*Primary Examiner* — Claire A Norris
(74) *Attorney, Agent, or Firm* — Feeney Law Group; Alan F. Feeney, Esq.

(57) ABSTRACT

The present invention relates to a shaft/frame system for high capacity rotors for wastewater treatment for sanitation purposes and to reduce the pollutant organic load; of the type formed by a drive shaft with supports at the ends and for its coupling to a drive motor, comprising a plurality of intermediate annular collars and two end annular collars distributed equidistantly from one another, adapted to fixedly receive a plurality of radially distributed structural arms, characterized in that said structural arms are substantially T-shaped and are joined each other to form rings adapted to receive and fix each other, packs of media consisting of a plurality of biomass support sheets, which are self-supported by four tubes fixed in T-shaped structural elements; wherein said tubes are hollow, and internally accommodate a volume of air and are obturated at both ends by means of plugs, with one or more threaded blind bore(s) adapted to receive the fixation means, with which it is fixed to the T-shaped structural elements, which exert a buoyancy force when
(Continued)

turning the rotor by effect of the contained air. In addition to have elements that helps to the resistant bonding with reduced stresses in the T-shaped structure.

26 Claims, 18 Drawing Sheets

(58) Field of Classification Search
USPC .................................. 210/150, 619, 232
See application file for complete search history.

(56) References Cited

U.S. PATENT DOCUMENTS

| | | | |
|---|---|---|---|
| 3,630,366 A | 12/1971 | Joost | |
| 3,645,510 A | 2/1972 | Klugman | |
| 3,704,783 A | 12/1972 | Antonie | |
| 3,904,525 A | 9/1975 | Rosenberg | |
| 4,115,268 A | 9/1978 | Thissen | |
| 4,137,172 A | 1/1979 | Sako et al. | |
| 4,149,972 A | 4/1979 | Iwai et al. | |
| 4,275,019 A | 6/1981 | Bednarski | |
| 4,289,626 A | 9/1981 | Knopp et al. | |
| 4,330,408 A | 5/1982 | McClure | |
| 4,345,997 A | 8/1982 | McConnell, Jr. et al. | |
| 4,385,987 A | 5/1983 | McGinley et al. | |
| 4,431,537 A | 2/1984 | Hirota | |
| 4,444,658 A | 4/1984 | Hankes et al. | |
| 4,537,678 A | 8/1985 | Thissen | |
| 4,549,962 A | 10/1985 | Koelsch | |
| 4,563,282 A | 1/1986 | Wittmann et al. | |
| 4,568,457 A | 2/1986 | Sullivan | |
| 4,604,206 A | 8/1986 | Sullivan | |
| 4,608,162 A | 8/1986 | Hankes et al. | |
| 4,668,387 A | 5/1987 | Davie et al. | |
| 4,692,241 A * | 9/1987 | Nicholson | C02F 3/082 210/150 |
| 4,692,250 A | 9/1987 | Miller | |
| 4,721,570 A | 1/1988 | Ankaitis | |
| 4,724,593 A | 2/1988 | Lang | |
| 4,729,828 A | 3/1988 | Miller | |
| 4,737,278 A | 4/1988 | Miller | |
| 5,227,055 A | 7/1993 | Timmons | |
| 5,281,335 A | 1/1994 | Kuhn | |
| 5,326,459 A | 7/1994 | Hlavach et al. | |
| 5,395,529 A | 3/1995 | Butler | |
| 5,401,398 A | 3/1995 | McManus | |
| 5,407,578 A | 4/1995 | Nathwani | |
| 5,419,831 A | 5/1995 | Fuerst et al. | |
| 5,423,978 A | 6/1995 | Snyder et al. | |
| 5,458,817 A | 10/1995 | Lang | |
| 5,498,376 A | 3/1996 | St Louis et al. | |
| 5,637,263 A | 6/1997 | Lang et al. | |
| 5,679,253 A | 10/1997 | Fuerst et al. | |
| 5,714,097 A | 2/1998 | St. Louis et al. | |
| 5,851,636 A | 12/1998 | Lang et al. | |
| 5,853,591 A | 12/1998 | Snyder et al. | |
| 6,071,593 A | 6/2000 | Lang et al. | |
| 6,241,222 B1 | 6/2001 | Lang | |
| 6,403,366 B1 | 6/2002 | Kim | |
| 6,540,920 B2 | 4/2003 | Bounds et al. | |
| 6,783,669 B1 | 8/2004 | Okagawa et al. | |
| 7,083,720 B2 | 8/2006 | Miller | |
| 7,156,986 B2 | 1/2007 | Warrow | |
| 7,811,449 B2 | 10/2010 | Warrow | |
| 7,879,232 B2 | 2/2011 | Warrow et al. | |
| 8,801,929 B2 * | 8/2014 | Davis | B01D 33/0093 210/331 |
| 2005/0133444 A1 | 6/2005 | Warrow | |
| 2007/0231218 A1 | 10/2007 | Warrow | |
| 2007/0231219 A1 | 10/2007 | Warrow et al. | |
| 2008/0053880 A1 | 3/2008 | Miller | |
| 2008/0210610 A1 | 9/2008 | Whiteman | |
| 2009/0250386 A1 | 10/2009 | Mayrand | |
| 2010/0282654 A1 | 11/2010 | Hauschild | |
| 2011/0017647 A1 | 1/2011 | Virloget | |

FOREIGN PATENT DOCUMENTS

| | | |
|---|---|---|
| JP | S58150492 | 9/1983 |
| MX | 167652 | 3/1993 |
| MX | 9404071 | 5/1994 |
| MX | 185983 | 9/1997 |
| MX | 2008005486 | 12/2008 |
| WO | 9811025 | 3/1998 |

OTHER PUBLICATIONS

Cortez et al. Rev. Environ. Sci. Biotechnol. 2008, vol. 7, p. 155-172, "Rotating biological contactors: a review on main factors affecting performance."

* cited by examiner

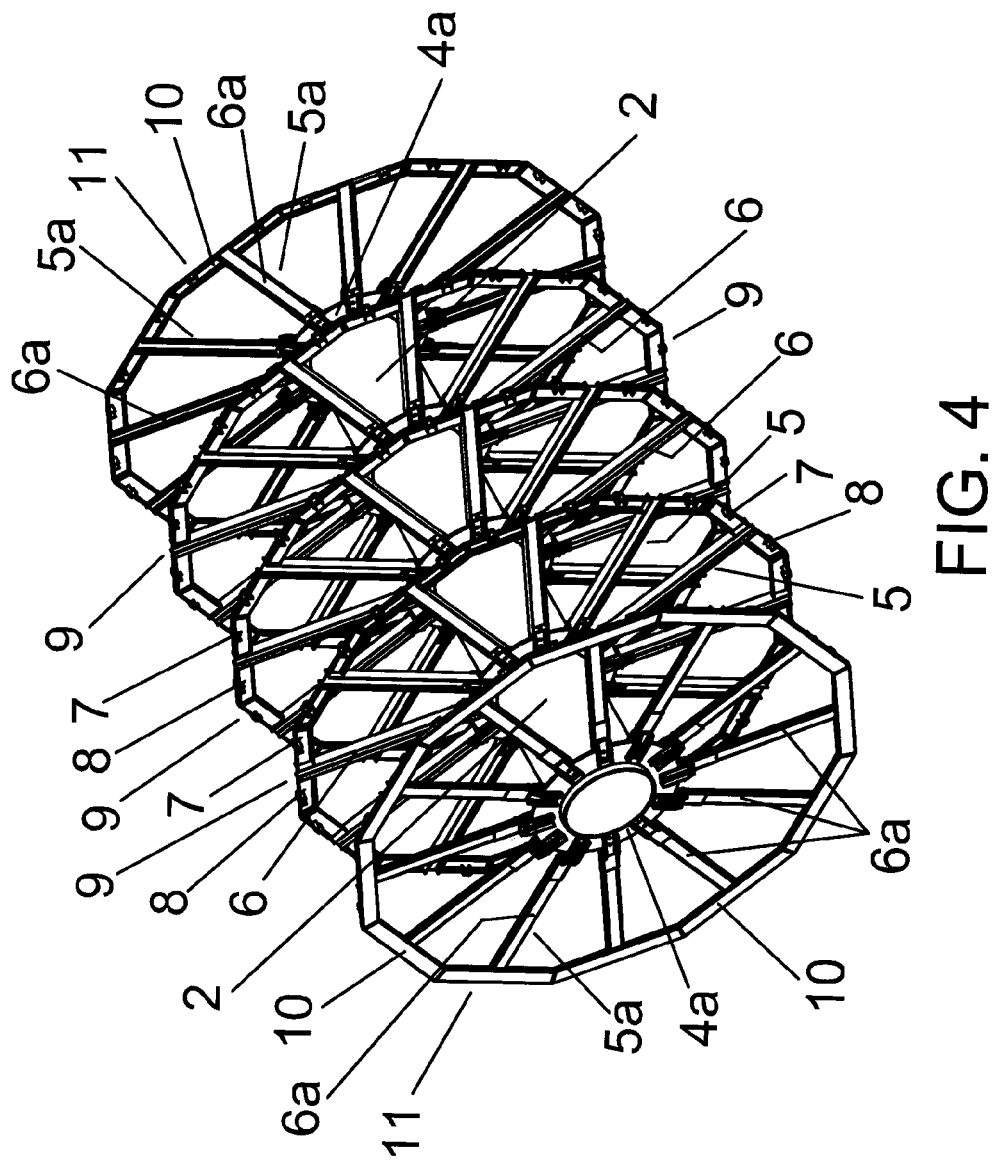

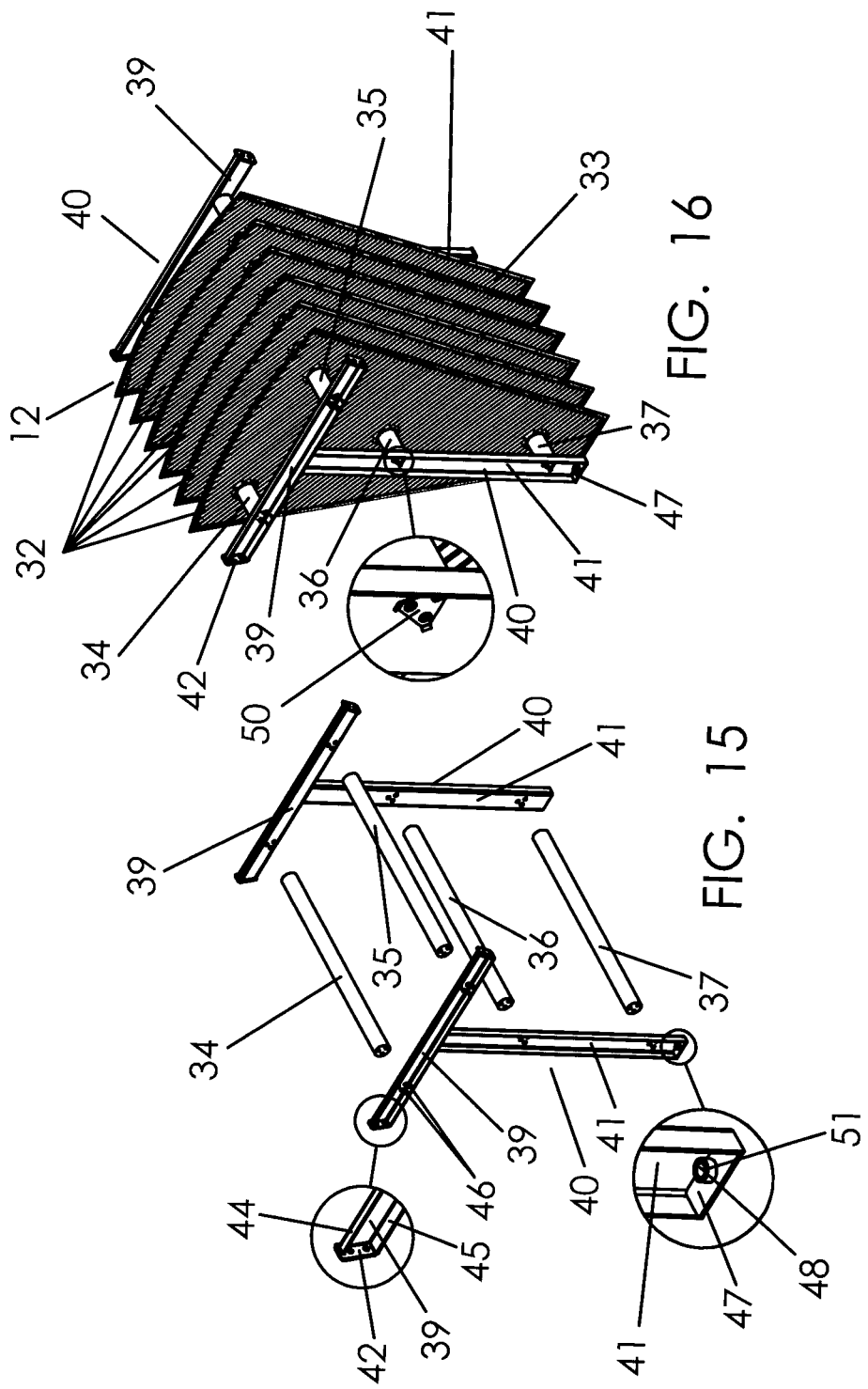

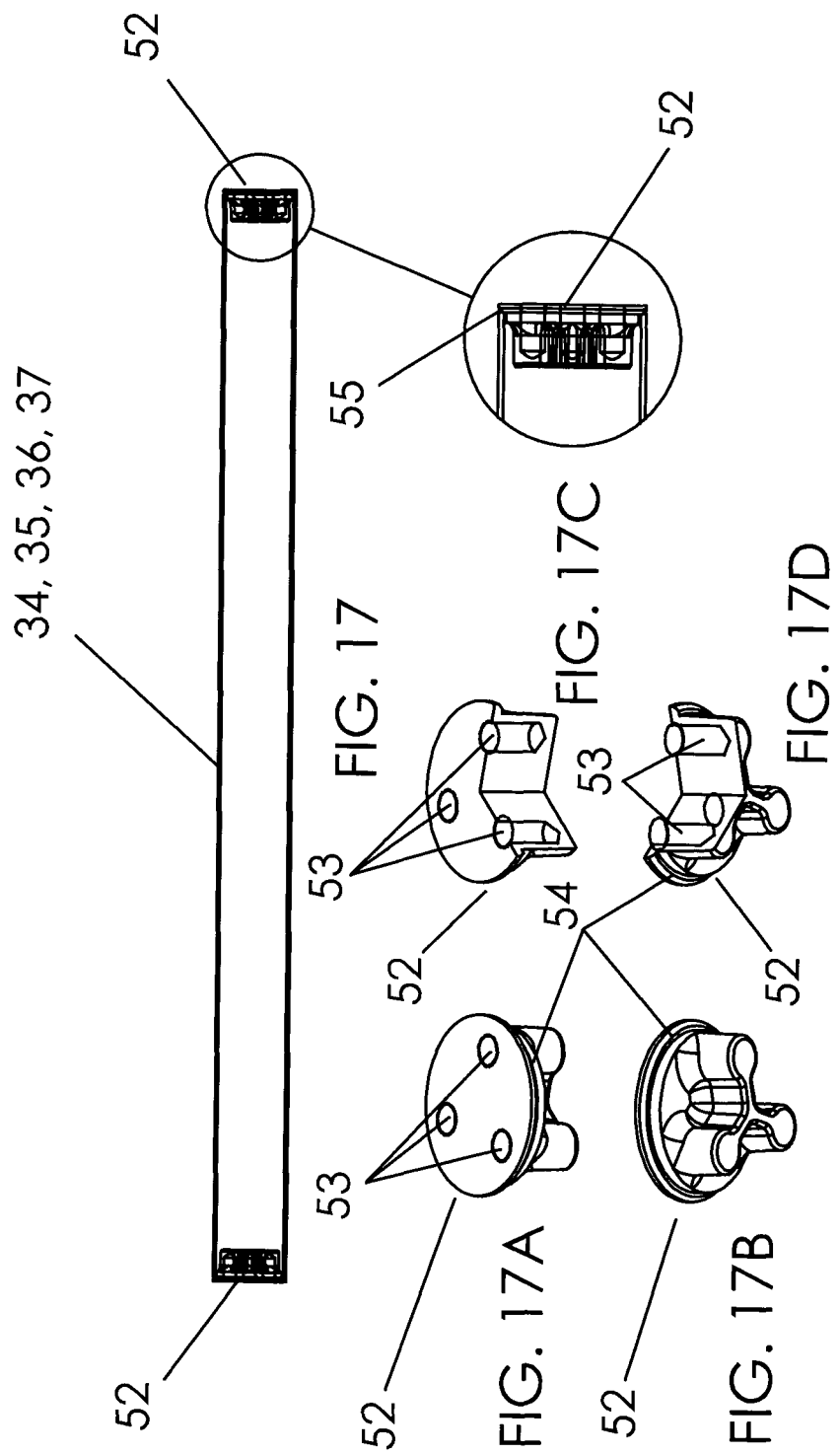

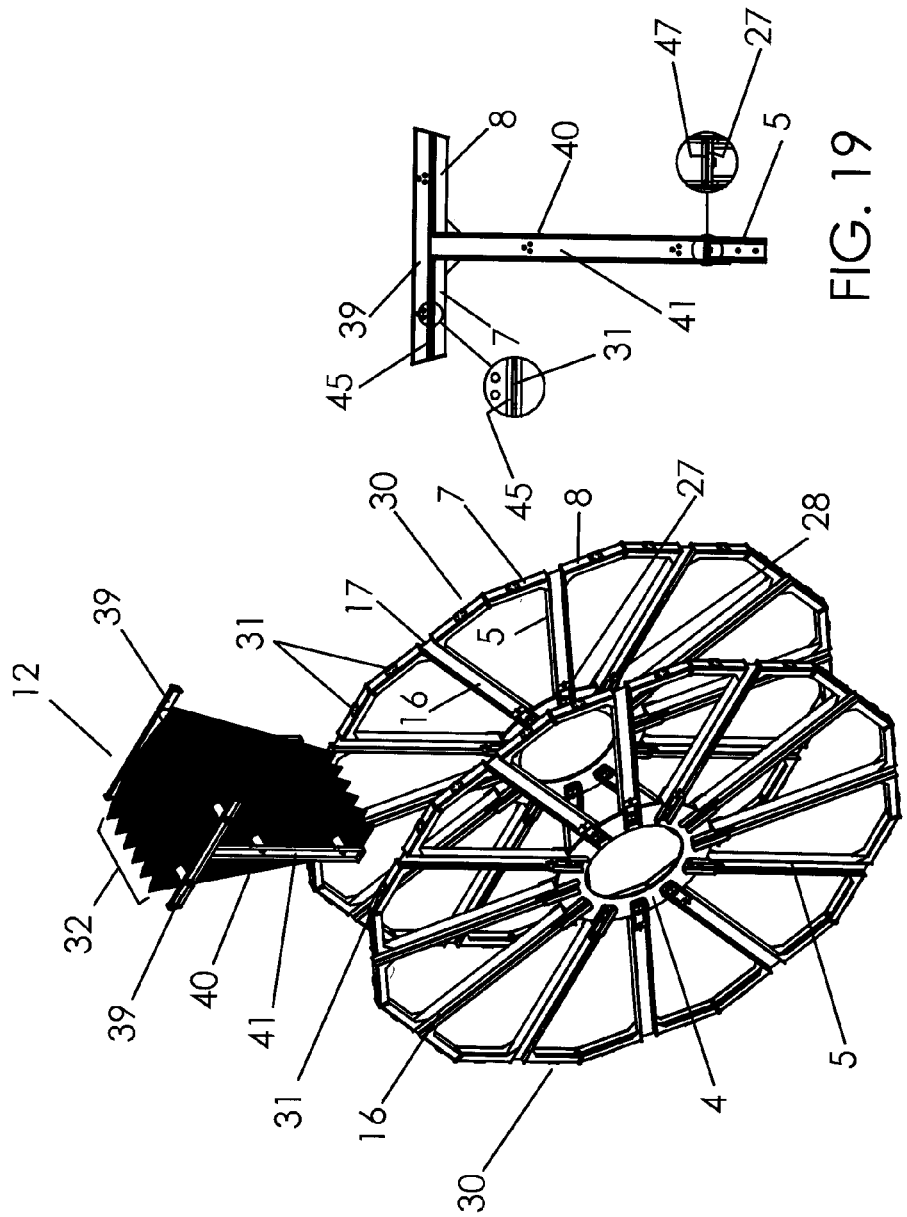

HIGH-CAPACITY BIOLOGICAL CONTACT ROTOR

CROSS-REFERENCE TO RELATED APPLICATION

This application is the U.S. national phase of PCT Application No. PCT/MX2012/000137 filed on Dec. 19, 2012, which claims priority to Mexican Patent Application MX/a/2012/000207 filed Jan. 3, 2012, Mexican Patent Application MX/a/2012/000208 filed Jan. 3, 2012 and Mexican Patent Application MX/a/2012/013686 filed Nov. 26, 2012 the disclosures of which are incorporated in their entirety by reference herein.

FIELD OF THE INVENTION

The present invention lies in the field of wastewater treatment; in general relates to the means and devices used in wastewater treatment plants and more specifically is referred to the structure of a high capacity biological contact rotor, also known as Rotating Biological Contactor RBC, from the type of biological contact rotors for wastewater treatment for sanitation and for decreasing the polluting organic load.

BACKGROUND OF THE INVENTION

Biological processes both aerobic and anaerobic are widely used in treatment of wastewater for its sanitation; the aerobic processes are performed usually on the upper part of water treatment tanks, where it is required aerators to enable aerate the water; therefore are used biological contact rotors (RBC) that in the early steps perform degradation of organic matter remaining of the water from an anaerobic treatment and in the later stages enables the growth of different nitrifying bacteria (*Nitrosomonas* and *nitrobacter*) which convert ammonia nitrogen to nitrites and then to nitrates that will be converted to nitrogen gas in the anoxic zone. The rotors consist of a plastic medium clamped by a steel structure to a central shaft which rotates constantly, so that the discs remain immersed about 40% and the medium remains in intermittent contact with water and air. Said steel structure defining a cylindrical frame with a rotating shaft driven by a motor and mounted on the upper part of a wastewater treatment tank, in said cylindrical frame are fixed or are mounted, packs of media which consist of a supporting means of biofilm for bacterial growth.

Existing rotors use as fixation means of biofilm, different elements as PVC tubes, high density polyethylene sheets or polypropylene to form a disc to be immersed up to 40% into the water of a wastewater treatment tank and the media remains in intermittent contact with water and air. Thus are created optimal conditions for microorganism growth on the media capable of degrading the organic matter contained in wastewater.

Thus are created optimal conditions for microorganism growth on the media to form a biofilm up to 5 mm capable of degrading the organic matter contained in wastewater. Existing rotors use as fixation means of biofilm different elements as PVC tubes, high density polyethylene sheets or polypropylene, all this forming a disc.

The problem with these conventional rotors is when are assembled, the fixing of the media are directly effected on the ring structure by means of fixing of steel elements supporting the media by using "Q" clamps, and screws, leaving the media in some cases permanently fixed.

The assembly of conventional rotors is carried out by structural members as "CPS" channels, which are assembled at the work site and its design consists of a simple arm to accommodate each one of the packages or sections of media, that is, for each end of the package is required a separate clamping arm; therefore the number of arms is equal to twice the number of packages to be placed. The circular ring formed by the set of these arms is formed by structural members as "L" angles independent from the arms.

Furthermore, the conventional arm designs have shortcomings regarding the scope of installation.

In the prior art the U.S. Pat. No. 4,385,987 of Charles M. McGinley, et al issued on May 31, 1983, which discloses an apparatus for wastewater treating including a rotating disc assembly partially immersed in a tank containing wastewater was found. The disc assembly includes a plurality of lightweight non-metallic discs, each disc comprising a plurality of similar disc sections. Adjacent discs of the disc assembly are coupled to each other and each disc has a surface configuration which cooperates with the next adjacent disc surface configuration to define a plurality of concentric passages between the discs. A plurality of elongated rigid bars secures the disc through joints to a pair of circular end supporting members and to the circular intermediate supporting members.

The rotor includes a polygonal shaft 18 in which are fixed supporting discs 29, including shaft central elements 30 which consist of a circular flat plate 31 having a plurality of grooves 35 and a polygonal central hole 32 to fit on the polygonal shaft 18. Each of the supporting discs comprises a plurality of elongated bars 34 projecting from the grooves 35 of the circular plate 31. The bars are radially projected and secured at its outer end to a ring member 36 with solder.

Semicircular packages 41 are mounted between said supporting elements 29 comprising the outer rings 36, said packages 41 being attached through a plurality of elongated plastic rods in the outer zone 63 protruding in the outer part and a plurality of rods in the protruding inner zone 64. Outer support rods 63 are fixed to the elements 59 fixed to the outer ring 36, while the inner rods 64 are projected through the supporting element, deeper in each section of the inner disc 36. Each end of the outer support rod 63, has a coupling flexible element 65 secured thereto.

Again is shown that packages are fixed exclusively with rods which are attached directly to the outer ring 36 and in the inner circular flat plate 31; so that to disassemble an intermediate package, must be removed the entire structure so as to detach the inner rods of the lower area. Furthermore, the mounting and dismounting operations are extremely complicated and require labor intensive.

It was also found the U.S. Pat. No. 4,444,658 of Robert W. Hankes and Lloyd H. Parker dated on Apr. 24, 1984 and which discloses a contact biological rotor comprising a tank, a shaft mounted for rotation in said tank, means for rotating said shaft and a plurality of frame assemblies. The shaft has a plurality of bayonet terminal rows. Each frame is adapted to be secured to one row spaced apart of terminals and is adapted to be mounted to the contactor. According to FIG. 3, the shaft comprises fixing flanges of a plurality of annular elements adapted to fix a plurality of L-shaped radial arms joined each other by means of tensioner arms, and said radial arms receive longitudinal braces which link packages to provide greater structural strength.

However, the L-shaped radial arms do not have the same configuration, or the same structure of the rotor, nor are assembled from structural arms compared with the present invention.

In FIGS. 7 and 8 also are shown semicircular packages 30 (media) formed by semicircular segments which are fixed by bolts 37 directly to the radial arms of the rotor; the semicircular segments have radial ribs which define pie shaped segments 34a, 34b and 34c, but the body of the package sheets remains semicircular, so that two semicircular packages are needed to form the rotor disc, and wherein said packages are directly fixed to the structural radial arms fixed at the rotation shaft.

There are several patents wherein are used segments of sheets or plates in the form of "pies" or slice of cake to form the media, for the assembling of the aeration rotor at wastewater treatment plant; but in all cases, these segments of sheets or plates in the form of "pies" are fixed directly to the structural arms radially arranged on the rotors and/or on arms or braces that attach said radial arms at their ends, so that when is required to change the media, must be disassembled whole structure of the rotor, as in the case of the U.S. Pat. No. 4,149,972 and EP0366477A1.

Was found the U.S. Pat. No. 4,692,241 of John L. Nicholson issued on Sep. 8, 1987, which discloses a biological rotor for treatment of biomass in a wastewater treatment plant, said rotor comprises packages 40, comprising biomass support sheets 41, 42, the package 40 being supported between support assemblies 43, 44 each of which comprises a circular ring 43a, 44a and a number of channel-shaped arms, 43b and 44b. The arms of each support assembly are bolted at its inner end to a radial flange (43c, 44c) of the rotor shaft 25, and at its outer end in the respective ring 43a, 44a and disposed in axial pairs along the shaft 25 such that for each adjoining pair of supporting assemblies, these pairs of arms 43b, 44b are in axial plane with their channels confronted.

Each package 40 includes a large number of biomass support sheets 41, 42 (typically 50 or more) that are threaded through the tubes 45, 46, 47. Each sheet 41, 42 has a slit 49 surrounding the hole where the respective tube 45-47 is located and has diagonal ribs/grooves 50 to harden the plastic sheets and to separate adjacent sheets.

The tubes 46 and 47 traverse the plurality of sheets 41, 42 at their upper part and are directly fixed to the circular rings 43a, 44a through the U-shaped supports, 52; likewise, the tubes 45 are fixed directly to the arms, 43b, 44b.

This way of fixing these packs of media cause that when must be exchanged or provide maintenance to these, all packs of media must be disassembled, implying many drawbacks in terms of maneuvers, costs, labor, management, etc.

Each tube 45 is sized so that the opposite ends slide within channels of a respective coplanar pair of arms 43b, 44b and a web plate 51 is provided in each channel.

The ends of the two tubes 46, 47 enter into the circumference of the rings 43a, 44a and can be fixed there with a U-shaped support 52.

Other related documents are U.S. Pat. No. 4,608,162, EP0366477, MX/a/2008/005486, MX167652, MX9404071, MX185983, which are only cited as reference of rotor structures of similar constructions, wherein are used structural arms L-shaped, T-shaped or U-shaped; but none of them shows, exhibits, or suggests a structural supporting arm for assembly of aeration rotor at wastewater treatment plant as that of the present invention.

Existing rotors have a structure that does not allow accommodate large number of media and wastes a lot of space. Furthermore, the installation of the rotor is slow and difficult, because it is performed entirely in the field or if it is armed and subsequently is transported to the work site, the transfer limits the size of the rotor (diameter and length).

Within the biological contact rotor (BCR), shaft is the structural member disposed to support the entire load or weight of the entire system such as the structural members, the polyethylene media, the biomass created during the biological process and all other accessories such as screws and rivets.

To design a shaft of a biological contact rotor, should be kept in mind that this component must be sufficiently strong, but at the same time should be optimized the design so that the weight does not increase and add more weight to the structure. That is, the problem is to reduce the weight of the shaft without sacrificing load strength. For this, is necessary an optimum structure of the rotor frame and an optimum fixation system of various elements of the rotor structure in order to avoid deformations due to flexion and/or deflection as a result of the load generated by the rotor structure itself, by the polyethylene media mounted on the rotor, by the biomass created during the biological process and all other accessories such as screws and rivets.

In the cited documents are also disclosed plates for media in the form of "pies" or slice of cake; but said plates usually are set by fixation means directly to the radial arms of the rotation axes of the rotors and in other transverse or diagonal arms, or braces joining said radial arms and in other cases are directly fixed to the outer and inner rings of the rotor support structures; such fixing ways involve a number of operations, logistics, costs, handling and excessive maneuvering among other difficulties that occur during transportation and installation; also, the individual components generate confusion at the work site by having a large number of individual pieces, which also demands a large work area which in many cases is not available.

Therefore, the present invention is directed to a high capacity biological contact rotor, for wastewater treatment, that enables a solid, stable, resistant and lightweight frame; with a novel fixation system of packs of media; which also allows greater density or concentration of mediums per meter, provides an alternative that allows improve the aerobic process of removing the polluting organic load for optimal sanitation of wastewater, which is achieved in a practical, economical and modular way.

OBJECTIVES OF THE INVENTION

The main objective of the present invention is to provide biological contact rotors (BCR) for treating wastewater for sanitation and for decreasing the polluting organic load, which provide a greater size than those manufactured in the market, since currently the systems which use conventional Biological Contact Rotors (BCR), are from 10,000 m2 to 16,000 m2 of media per rotor. With the invention are achieved even more than 45,000 m2 of media per rotor; thus leading the principle of Biological Contact Rotor (BCR), in an economically viable way to large capacity plants, both for initial investment as operating cost.

Another objective of the invention is to make available said high capacity biological contact rotor, which also allows generate a more resistant, lightweight and easy to assemble rotor frame.

Another objective of the invention is to make available said high capacity biological contact rotor, which also allows generate a rigid structure wherein all components contribute to support the entire load and in turn their own weight, being resistant to flexion and/or deflection.

Another objective of the invention is to make available said high capacity biological contact rotor, wherein all components also generally help to the structure to absorb efforts as a single rigid structure of much greater profile that the shaft by itself.

Another objective of the invention is to make available said high capacity biological contact rotor which also allows even distribution of the load into all adjacent elements of the structure.

Another objective of the invention is that said biological contact rotor, also allows a higher density or concentration of media per meter, providing an alternative that allows improve the aerobic process of removal of the polluting organic load for optimal sanitation of wastewater.

Another objective of the invention is that said biological contact rotor, also allows a self-assembly of the outer ring, distributes the load evenly to all the adjacent elements of the structure and represents an assembly system through of sliding parts by means of high strength structural arms.

Another objective of the invention is that said biological contact rotor further comprises unique structural arms at the intermediate steps and decrease the amount of arms to the structure, and in turn that the geometry of the arm helps to provide greater rigidity and strength to the structure in general.

Another objective of the invention is that said biological contact rotor also allows faster assembly and generates structural rings in a fast, practical and efficient way, allowing for greater tolerance in diameter without affecting its resistance and providing greater contact surface.

Another objective of the invention is to allow said biological contact rotor further comprises a fixation system of media allowing pre-assembly of the packs of media before its installation in the biological contact rotor to simplify the assembly of the media through simple, practical and functional structural elements in their coupling to the rotor frame.

Another objective of the invention is to permit that such biological contact rotor also allows simplify logistics, handling and installation of the packs of media in the frame of biological contact rotors.

Another objective of the invention is to enable that said biological contact rotor allows that packs of media are easily handled in transportation and installation, and which provide greater rigidity to the structure, making it safer for handling, maneuvering and installation.

Another objective of the invention is that said biological contactor rotor also allows generate packs of media structurally self-stackable, with the possibility of vertical storage, accessible lifting points and accuracy of the assembly by connections at strategic points.

Another objective of the invention is that said biological contact rotor also allows removing, disassembling and exchanging of packs of media individually, from the frame of the rotors, in a fast, practical, functional way without having to disassemble or disassemble all the structure of the biological contact rotor frame for aeration in wastewater treatment plants.

Another objective of the invention is that said biological contact rotor also is structurally simple, easily assembled, without skilled labor and without requiring difficult maneuvers for its installation.

And all those qualities and objectives which will become apparent when performing a comprehensive and detailed description of the present invention supported by the illustrated embodiments.

SUMMARY OF THE INVENTION

In general, the high capacity biological contact rotor for wastewater treatment for sanitation and for reducing the polluting organic load, in accordance with the present invention comprises a drive shaft which is housed in a cylindrical tube of great diameter with a coating to prevent corrosion and end supports for its placement in the wastewater treatment tank and for its coupling to a drive motor; said cylindrical tube comprises a plurality of annular collars equidistantly distributed each other along its longitudinal section, being adapted each annular collar to receive fixedly a plurality of radially distributed structural arms; said structural arms are substantially T-shaped defining a vertical straight element having attached at its upper end at least one horizontal straight element defining the "T"; each of said horizontal straight elements being adapted to be fixed with fixation means to other horizontal straight element of an adjoining arm, defining the plurality of horizontal straight elements of adjoining arms, a polygonal structural ring in each annular collar, supported by said plurality of vertical straight elements, radially attached in each collar.

Such T-shaped structural arms distributed radially on each shaft annular collar, are formed by a vertical straight element consisting of a I-shaped structural steel beam of IPR type steel, formed by two skids attached to the center by a web, defining two opposite vertical channels, and comprising in its lower end a pair of dorsally opposed fixed plates defining a separation for embracing a portion of the annular collar, where these are fixed with various fixation means; a perforated perpendicular plate is fixed on the lower part of each channel at the limit of the ends of said dorsally opposed fixed plates, to receive fixation means to fix the structure of the packs of media; said horizontal straight elements in its preferred embodiment consist of sheet elements and U-shaped folded plate, fixed to the outer side of the corresponding skid on the upper end of each vertical straight element of the I-shaped profile of said structural arms, forming the "T" with welding or other attachment means. Fixing of said horizontal straight elements is made edgewise and comprises an end plate at each end with respective holes to receive fixing means to be fixed with other horizontal straight elements of adjoining arms of the same configuration to define the polygonal rings.

Said horizontal straight elements of each structural arm further comprise at the upper face, respective perforated plates adapted to receive fixation means to fix the structure of packs of media.

In one of the embodiments of the invention the structural arms radially distributed that are fixed to the intermediate annular collars are partially different in structure respect to the structural arms that are fixed to the end border collars; the structural arms being configured radially distributed so that are fixed to the intermediate annular collars as described and the plurality of vertical straight elements of the structural arms that are radially fixed in the outer collars of the rotor, consist of U-shaped profiles that define a vertical channel that will remain in front of the vertical channel of the vertical elements of the intermediate arms defining the intermediate polygonal rings, to facilitate insertion and fastening of the interchangeable packs of media. And comprising the same configuration and elements at its lower end that the intermediate structural arms.

The plurality of adjoining polygonal rings equidistant one from another, are distributed across the longitudinal section of said cylindrical shaft defining the rotor structure; two adjoining polygonal rings being adapted to receive and fix packs or sections of media.

These packs of media consist of a plurality of polyethylene biomass supporting sheet, thermoformed, collinearly grouped and partially spaced one from another, comprising ribs on both sides to provide firmness and separate the adjacent sheets; which are self-supported with a supporting structure where biofilms that generate a larger surface of contact and aeration to the proliferation of aerobic bacteria allowing digest the polluting organic load are arranged.

In another of the embodiments of the invention, the vertical straight elements of the structural arms comprise at least one ribbed body laterally fixed, inverted below the horizontal straight elements, diagonally projected toward the lower end, with respective holes adapted to receive fixation means to fix at another point, the packs of media; in addition to serving as support means of outer braces to stabilize the structure when the packs of media are assembled.

The arms allow for self-assembly of the outer ring, distribute evenly the load to all adjacent elements of the structure, and represent an assembly system through sliding parts by means of the arm.

With this frame and the configuration and design of the arms and polygonal rings, the rotor may have a diameter greater than 4.5 m, and can be of a diameter of 5.5 m so that has a greater availability of contact area for bacteria growth per meter of shaft, that is, to provide the same contact area, the space requirement at the plant is lower than in conventional rotors and can be decreased the length of the shaft which represents a saving in material (steel) and less burden on the gear-motor.

Another advantage is the modular assembling that allows a simple and quick installation at the site. Besides being adapted said frame in order for each pack of media is independent and interchangeable, that is, it can be changed later if necessary without affecting the overall structure.

Said fastening system of packs of media for assembling of the high capacity biological contact rotor, in accordance with the present invention consists of a plurality of biomass support sheets collinearly grouped and partly spaced apart one from another, comprising ribs and/or grooves on one or both sides and in one or different directions for harden and separating the adjacent sheets; which are self-supported by a plurality of supporting and fixation transversal elements which penetrate said plurality of biomass support sheets through holes made in defined zones, which are joined at both ends at two T-shaped structural elements that externally embrace the group of biomass support sheets, together defining a pack of media that can be installed and fixed through said T-shaped structural elements between a pair of adjoining structural rings of the biological contact rotor frame.

Said pairs of T-shaped structural elements, externally embrace the group of biomass support sheets, together defining a pack of media.

In the preferred embodiment of the invention, each of said T-shaped structural elements are formed by at least one fixed horizontal straight arm at its central portion at the upper end of a vertical straight arm.

In the preferred embodiment of the invention, said plurality of biomass support sheets is supported by tubes, bolts, rods or bars and preferably by carbon steel tubing galvanized or coated with another material with similar properties, which traverse transversally said plurality of biomass support sheets, through holes; being disposed two tubes, traversing the upper zone of said plurality of biomass support sheets, and being fixed at their ends in an zone close to the ends of a horizontal straight arm of two T-shaped structural elements, and being disposed the remaining two tubes, traversing the central zone and the lower zone of said plurality of biomass support sheet, being fixed in their ends in the central zone and the lower zone of a vertical straight arm of the T-shaped structural elements.

Said horizontal and vertical straight arms that form the T-shaped structural elements that externally embrace the group of biomass support sheets, together defining a pack of media, are preferably made from carbon steel sheet or other material of similar properties by processes such as punching, stamping and bending, in the form of "U" that provide greater rigidity and strength.

Said horizontal straight arm of said T-shaped structural elements, that externally embrace the group of biomass support sheets together defining a pack of media, has a shape of "U" and in each end comprises a perpendicular end plate with one hole for receiving attachment means to be fixed with the end of other horizontal straight arm of another adjoining structural element, and when joining, a plurality of T-shaped structural elements defines a disc of media.

Said horizontal straight arm of said T-shaped structural elements is arranged horizontally defining a traverse longitudinal channel defining an upper flange and a lower flange comprising respective holes adapted to receive fixation means to be fixed on the perforated plates of said horizontal straight elements from each structural arm of the structural rings of a biological contact rotor frame.

Said vertical straight arm of said T-shaped structural elements of the packs of media, comprises at its lower end, a perforated perpendicular end plate to receive an attachment means for fixing said perforated perpendicular plates fixed on the lower part of each channel of said radial structural arms of a biological contact rotor frame.

Wherein said opposed vertical channels of said T-shaped structural arms radially distributed on each annular collar of the shaft, serve as guide to slide the corresponding vertical straight arms of the T-shaped structural elements that externally embrace the group of biomass support sheets, together defining a pack of media, so that the assembly is fast, efficient and firm in multiple points.

Wherein said T-shaped structural elements are adapted to be laterally fixed with other T-shaped structural elements of similar adjoining packs of media to form a disc of media and comprising receiving elements of fixation means to be fixed on radial structural arms of the corresponding structural rings of the biological contact rotor frame.

In one of the embodiments of the invention, the rotor further comprising a plurality of attachment elements between packs of media, which consists of a plurality of inverted U-shaped plates which are fixed with various fixation means embracing portions of said horizontal straight arms of said T-shaped structural elements that externally embrace the group of biomass support sheets, together defining a pack of media.

In the preferred embodiment of the invention, said carbon steel tubes coated to protect them against corrosion or from other material of similar properties that traverse crosswise said plurality of biomass support sheets through holes, are hollow tubes that host internally one volume of air and that are sealed on both ends by means of steel plugs, machining with one or more threaded blind bore(s) normally with diameter of 1.5875 cm (⅝") 18 UNF.

These plugs are attached to the ends of the tubes by electric arc welding and subsequently the welding is buffed to give a polished finish. The finished part prevents water leaks into the tubes, preventing that the corrosion process, by presence of water inside the tube, generates a shorter lifespan of the part. This method of sealing with the plugs at the ends of the tube allows at the time of rotating the rotor, when the tube is submerged, the buoyancy force that occurs is equal to the displaced volume of air inside the tubes due to density of wastewater. This is governed by the principle of buoyancy, which says: "A body in a fluid, either floating or submerged, is pushed upward by a force equal to the weight of the displaced fluid". This buoyancy force is harnessed to reducing the weight of the rotor structure which is submerged.

The plug serves to seal the tube ends to ensure that no leakage of water into the tube and is accelerated the oxidation process in the internal walls of the tube. The plug has a bevel of 2.38 mm of 45° like the tube ends, so that at the moment of the mounting, the plugs and the ends of the tube form a V-shaped groove of 90°, which serves to greater penetration of the filler material and better bonding between the tube and plug, and which when functioning as guide allows easy assembly and prevents the plug scratching the internal wall of the tube. Furthermore, It has one or more threaded blind bore(s) usually with diameter of 1.5875 cm (⅝") that allows the strengthening in the "T" of the sheets. The blind bore is adapted to receive fixation means that fix the tubes to the corresponding horizontal and vertical straight arms of said T-shaped structural elements, which externally embrace the group of biomass support sheets, together defining a pack of media.

The whole system, shaft, arms and wedge fastening systems, creates a rigid structure identical to a frame, where all these components contribute to support the whole load and also its own weight. All elements are interconnected, generating a single element which transmits the forces to other elements.

Same as a beam simply supported at its ends and subjected to a uniformly distributed load, the stress by bending momentum (equation 1) is in function of the bending momentum (M), the height of the centroidal axis to the outer edges (c) and the inertia momentum of the cross section (c).

$$\rho max = \frac{Mc}{I} \quad \text{Equation 1)}$$

Due to the action of this load on the beam, occurs a deflection (Equation 2) which is calculated by knowing the applied load (W), the length between supports (L), the elastic modulus of the material (E) and the inertia momentum (I).

$$y = \frac{5}{384} \frac{WL^3}{EI} \quad \text{Equation 2)}$$

The inertia momentum indicates the rigidity of an element, i.e., its deflection resistance when subjected to loads tending to flex. The inertia momentum is denoted by the cross section area relative to the centroidal axis, so it is deduced that if the majority of the area is placed far from the centroidal axis, the inertia momentum will tend to be high, and therefore, the effort and deflection of the element will decrease.

This process is accomplished as explained above, taking advantage of all structural elements to create a single rigid element for the rotors of 5.5 m of nominal diameter with distribution of 6 collars on the shaft and for the rotors of 6.5 m of nominal diameter with distribution of 7 collars on the shaft; the diameters of the rotors and the collars distribution may increase or decrease but the principle is the same.

To better understand the features of the invention are accompanied to this description as an integral part thereof, the drawings that with illustrative but not limiting character are described below.

BRIEF DESCRIPTION OF THE FIGURES

FIG. 4 shows a conventional perspective view of the biological contact rotor frame for aeration in wastewater treatment plant, in accordance with the present invention, where the structural arms of FIGS. 2 and 3 are used.

FIG. 15 shows an exploded view, of the assembly structure of a pack of media for the biological contact rotor for aeration in wastewater treatment plant, in another embodiment of fixing the tubes that traverse the biomass support sheets.

FIG. 16 shows a conventional perspective view of a pack of media defined by the fixation system for assembly of the aeration rotor in wastewater treatment plant, in accordance with FIG. 15.

FIG. 17 illustrates a longitudinal section of a hollow tube used in the assembly of a group of biomass support sheets for a pack of media of the biological contact rotor, in accordance with the present invention.

FIG. 17A shows a top perspective view of a plug of the ends of the hollow tubes shown in FIGS. 15 to 17.

FIG. 17B shows a bottom perspective view of a plug of the ends of the hollow tubes shown in FIGS. 15 to 17.

FIG. 17 C shows a top perspective view with a cake cut of a plug of the ends of the hollow tubes shown in FIGS. 15 to 17.

17D shows a bottom perspective view with a cake cut of a plug of the ends of the hollow tubes shown in FIGS. 15 to 17.

FIG. 18 shows a conventional perspective view of a pair of rings of biological contact rotor according to FIGS. 8, 9 and 15 to 17D, illustrating the placement of a pack of media.

FIG. 19 shows a front view of the joining of a T-shaped structural element of a pack of media illustrated in FIG. 16, fixed at one of the structural arms of the biological contact rotor in accordance with the present invention.

Figure 20:
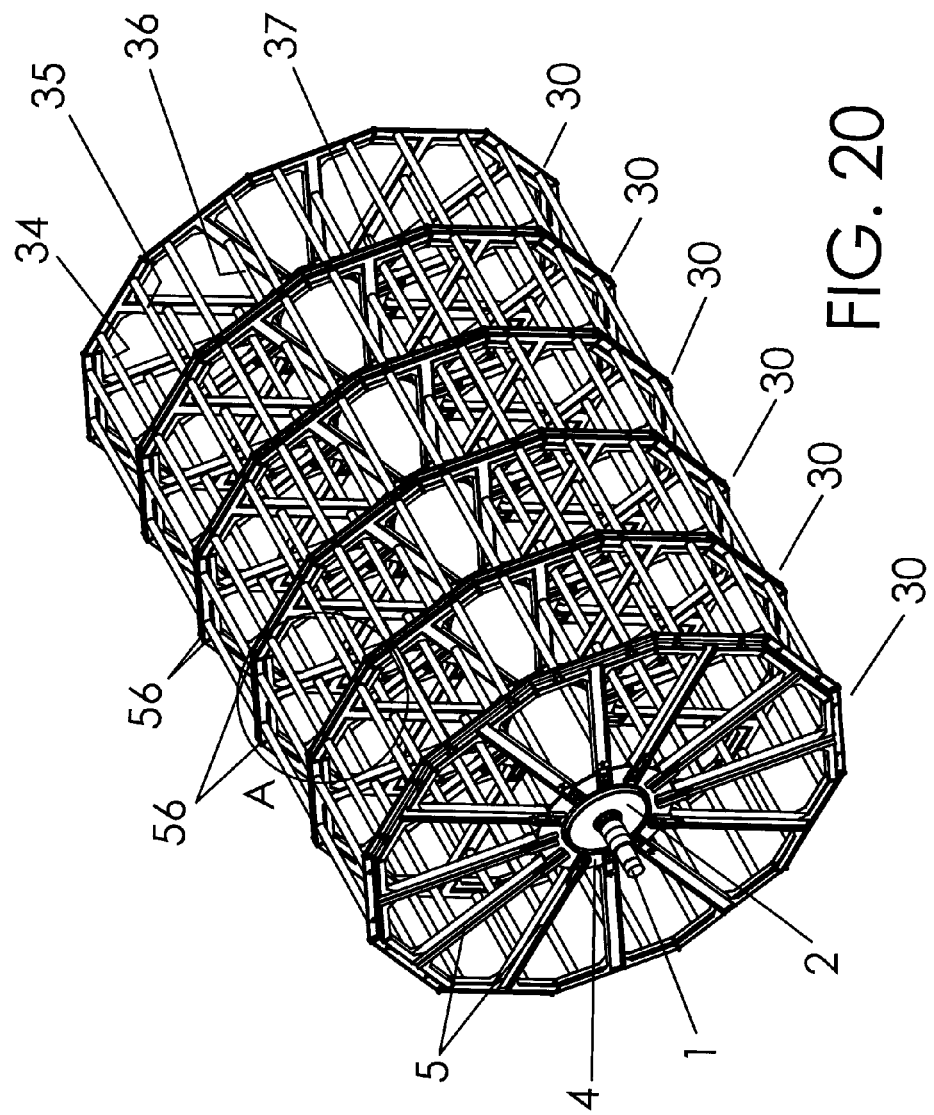

FIG. 20 illustrates a conventional perspective of the assembled rotor frame, in the absence of biomass support sheets of packs of media, according to FIGS. 1, 8, 9, 15 to 17D.

Figure 21:
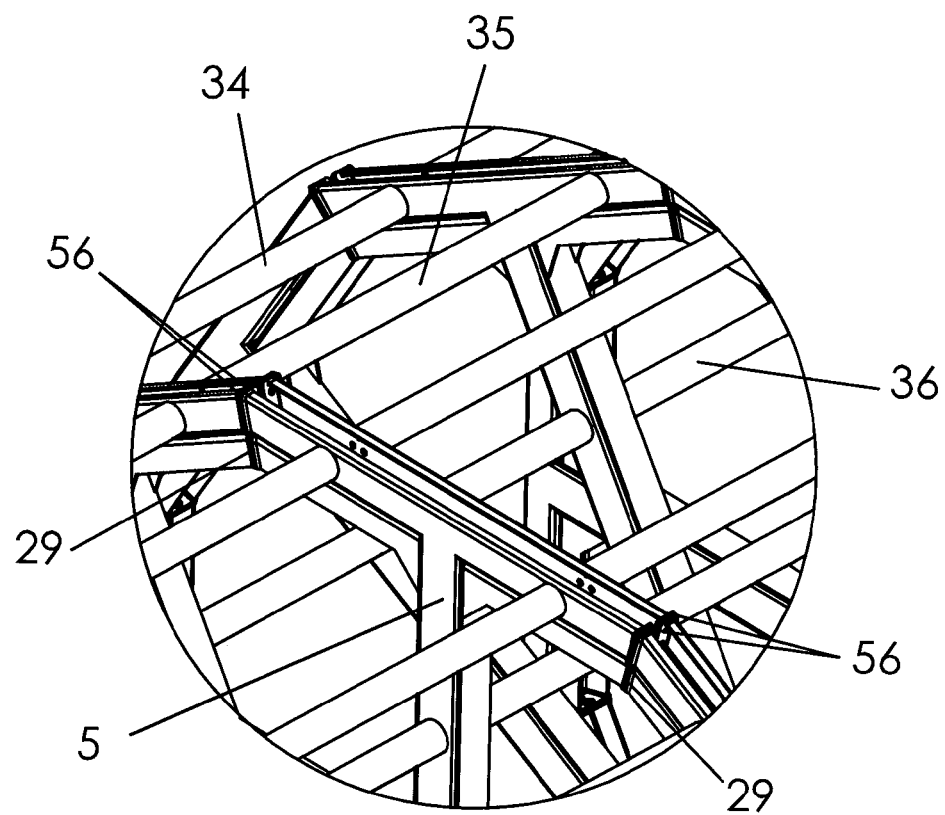

FIG. 21 shows a conventional perspective view of the detail "A" shown in FIG. 20 of the biological contact rotor frame, illustrating the reinforced binding between each other of the horizontal straight arms and the T-shaped structural elements forming packs of media.

For a better understanding of the invention, it will make a detailed description of someone of the embodiments thereof, shown on the drawings which with illustrative but not limiting purposes are annexed to the present disclosure.

DETAILED DESCRIPTION OF THE INVENTION

The characteristic details of the high capacity biological contact rotor for wastewater treatment are clearly shown in the following description and in the appended illustrative drawings, serving the same reference signs to indicate the same parts.

Figure 1:
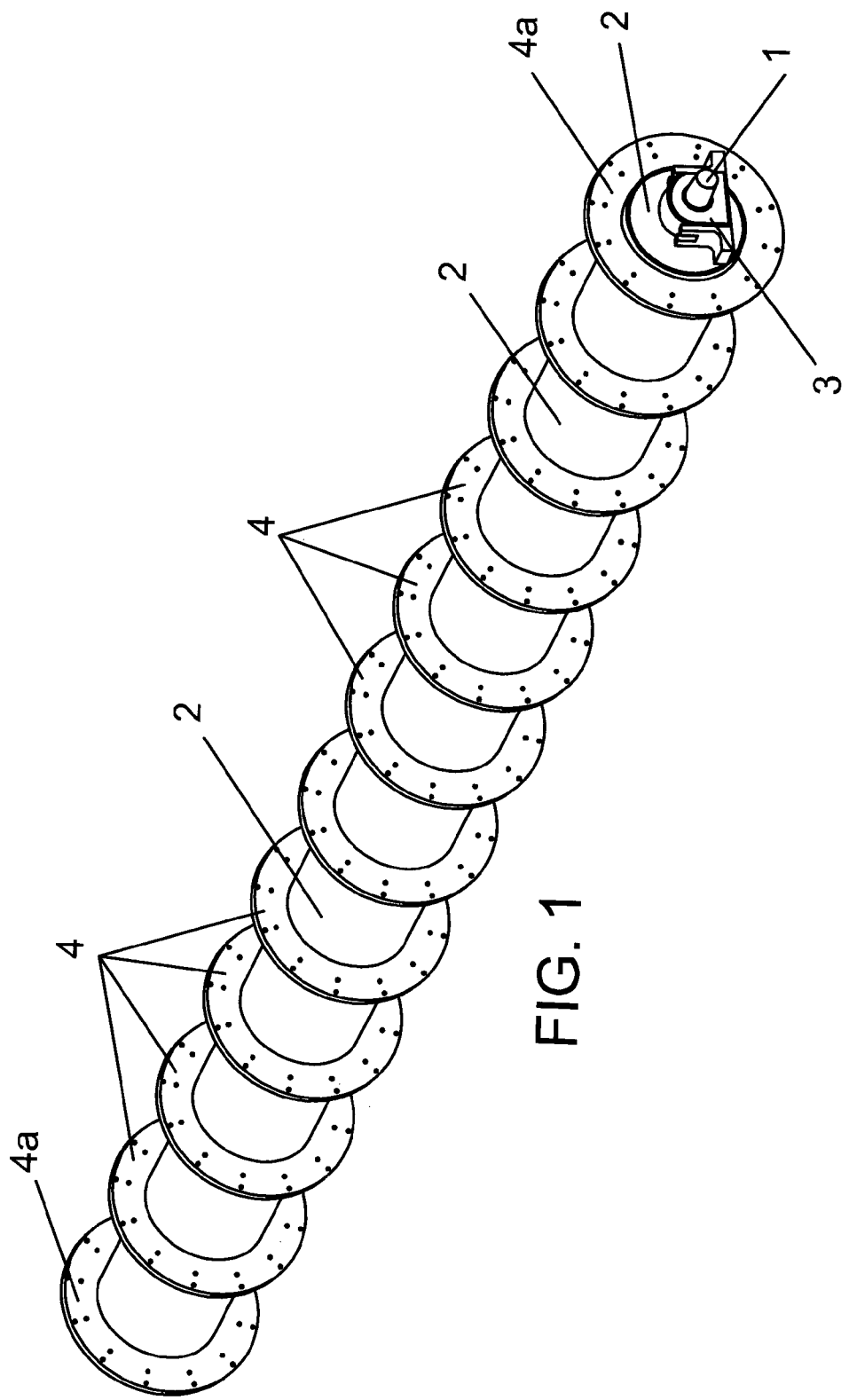
FIG. 1 shows a conventional perspective of the drive shaft and cylindrical tube as the core of the biological contact rotor frame for aeration in wastewater treatment plant, in accordance with the present invention.

Referring to FIG. 1, the rotor is composed of a drive shaft 1 which is housed in a cylindrical tube 2 of great diameter, with a coating to prevent corrosion and with supports at the ends 3 for its placement in the wastewaters treatment tank and for its coupling to a drive motor (not shown); said cylindrical tube 2 comprises a plurality of intermediate annular collars 4, equidistantly distributed each other along its longitudinal section and two border annular collars a the ends 4a, adapted each annular collar to receive fixedly a plurality of radially distributed structural arms (see FIGS. 2 to 4); using fixation means (not shown) that are passed through holes made in said collars for fix radially, said structural arms.

Figure 3:
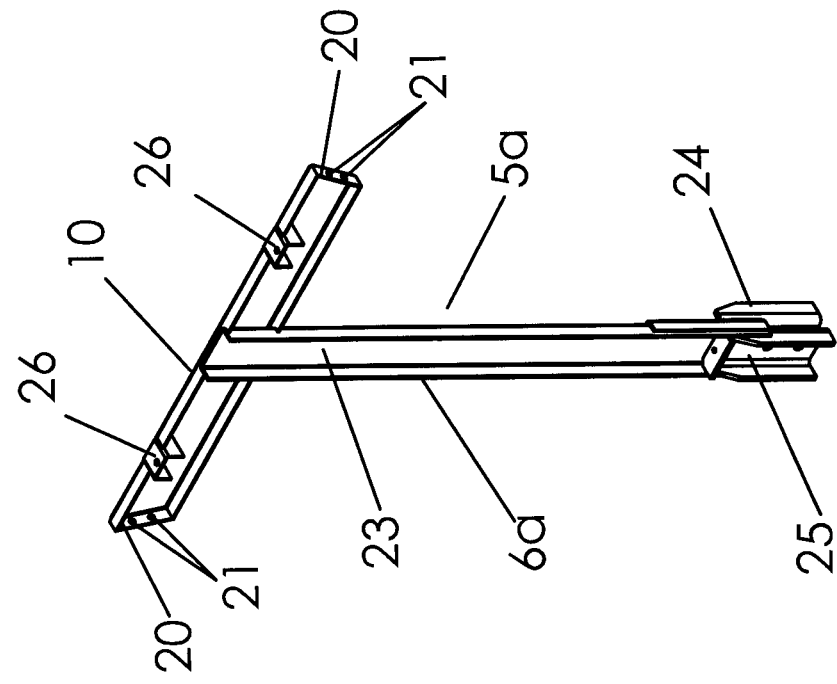
FIG. 3 shows a conventional perspective view of another embodiment of the structural arm when is in the end, and forming the outer polygonal rings of the biological contact rotor frame for aeration in wastewater treatment plant, in accordance with the present invention.

According to FIGS. 2 and 3 to 7, the frame of the high capacity biological contact rotor, for aeration at wastewater treatment plant, comprises then the core as illustrated and described in FIG. 1, in whose cylindrical tube 2 is fixed the plurality of intermediate collars 4 that receive a plurality of structural arms 5 (see FIG. 2) radially distributed; and the end border annular collars 4a, that receive radially the plurality of external structural arms 5A (see FIG. 3).

Figure 2:
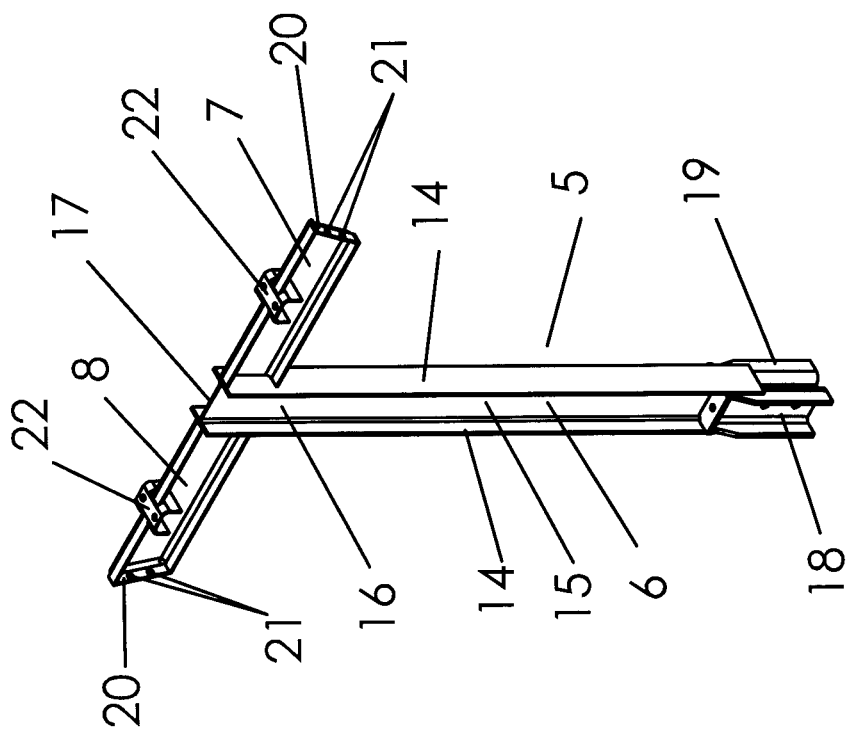
FIG. 2 shows a conventional perspective view, of one embodiment of the intermediate structural arm as modular unit for forming polygonal rings of the Biological contact rotor frame for aeration in wastewater treatment plant, in accordance with the present invention.

According to FIGS. 2 and 4, said intermediate structural arms 5 are substantially T-shaped that defines a vertical straight element 6 having attached at its upper end two horizontal straight elements 7 and 8 defining the "T", each one of said horizontal straight elements 7 and 8 being adapted to be fixed with fixation means to other horizontal straight element of an adjoining arm, defining the plurality of horizontal straight elements of adjoining arms joined each other, a structural polygonal ring 9 (see FIG. 4) in each intermediate annular collar 4, supported by said plurality of vertical straight elements 6 radially attached in each intermediate collar 4.

According FIGS. 3 to 7, said external structural arms 5a are substantially T-shaped that defines a vertical straight element 6a, having attached at its upper end, a single horizontal straight element 10 defining the "T"; each of said horizontal straight elements 10 being adapted to be fixed with fixation means to other horizontal straight element 10 of an adjoining vertical straight arm 6a, defining an outer structural polygonal ring 11 (see FIG. 4) in each end border annular collar 4a.

Figure 5:
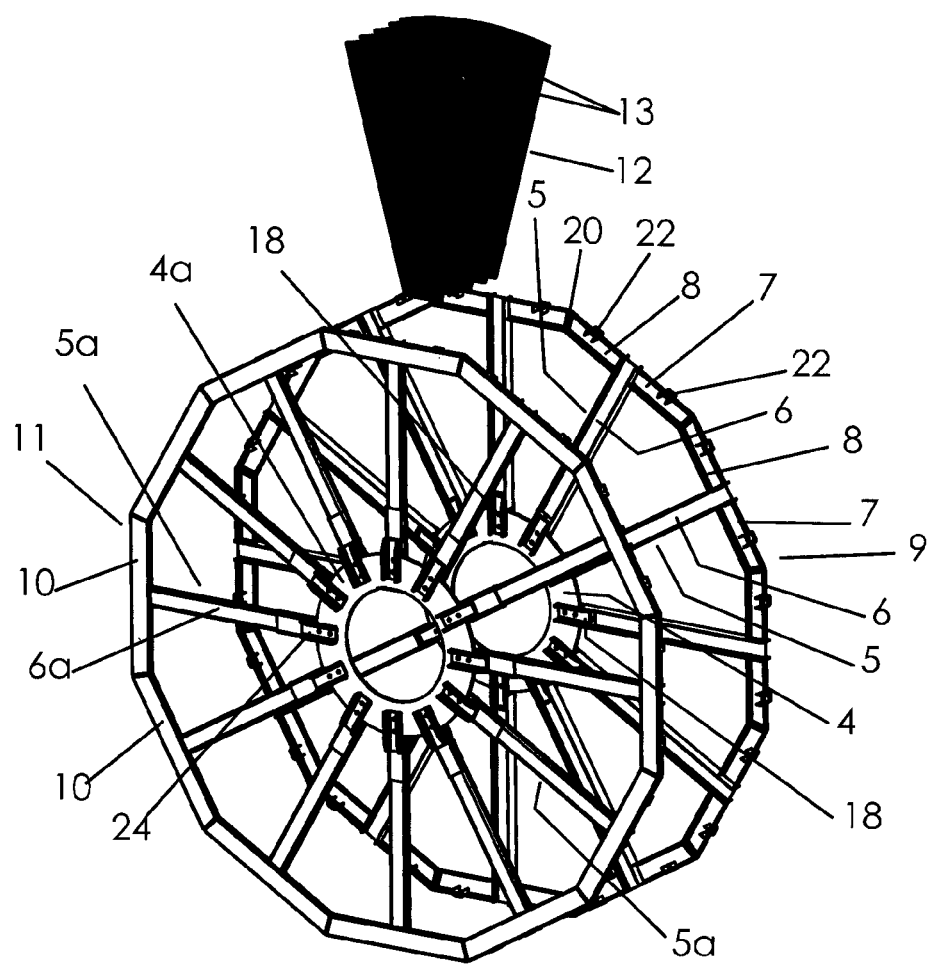
FIG. 5 illustrates a conventional perspective view of a pair of polygonal rings of the biological contact rotor frame for aeration in wastewater treatment plant, as illustrated in FIG. 4; illustrating a package or media for its coupling.
Figure 6:
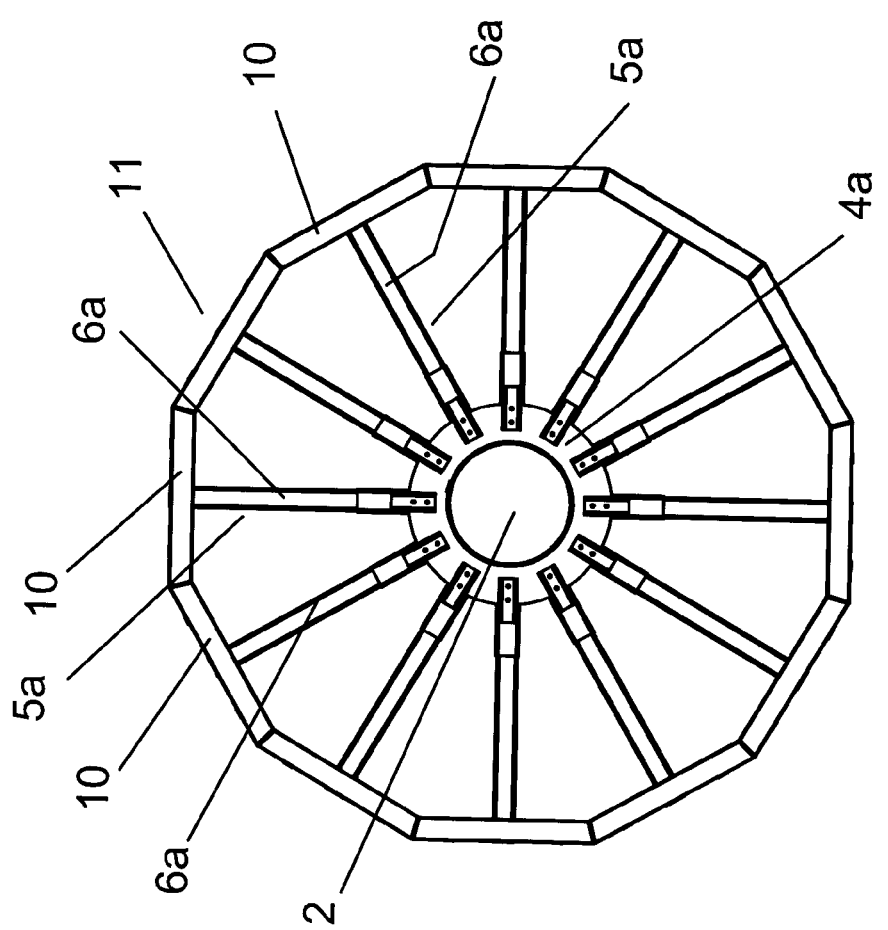
FIG. 6 shows an end side view of the biological contact rotor frame for aeration in wastewater treatment plant, shaped according to the FIGS. 2 to 5.
Figure 7:
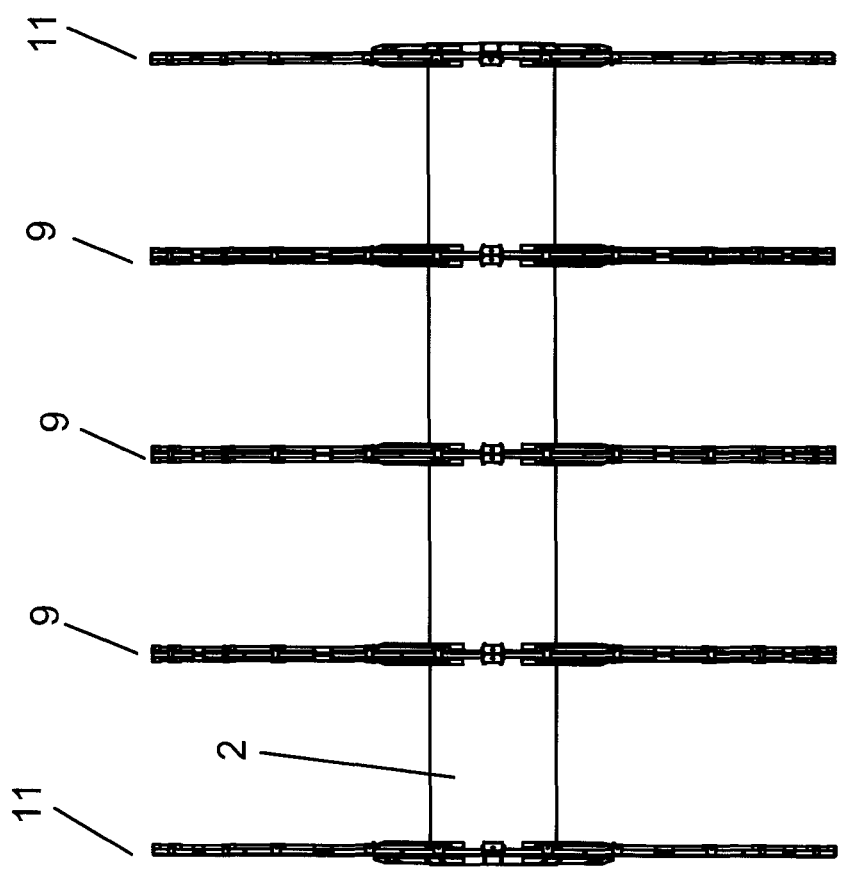
FIG. 7 shows a front view of the biological contact rotor frame for aeration in wastewater treatment plant, according to FIG. 6.

Referring to FIGS. 2, 4 and 5, the structural arms 5 which are fixed to the intermediate collars 4 (see FIG. 1) are formed by a vertical straight element 6 which consists of a I-shaped structural steel beam of IPR type steel, formed of two skids 14 attached to the center by a core 15 defining two opposite vertical channels 16, 17, wherein said opposed vertical channels 16, 17 of the vertical elements 6 of opposing structural arms of said adjoining polygonal rings, serve as guide to slide the fixation structure of the packages or interchangeable media sections 12 (see FIG. 5). Each of said vertical straight elements 6 comprises at its lower end a pair of dorsally opposed fixed plates 18, 19, that define a separation to embrace a portion of the annular collar 4 (see FIG. 5) where these are fixed with diverse fixation means (not shown).

At the upper end of said vertical straight element 6 the two horizontal straight elements 7, 8 are fixed with solder or other attachment means, in the outer side of the corresponding skid 14 at the upper end of each vertical straight element of the I-shaped profile of said structural arms forming the "T". Said horizontal straight elements 7, 8 consist of sheet elements and U-shaped folded plate, edgewise fixed at the sides of said vertical straight element 6, and comprising an end plate 20 with respective holes 21 for receiving fixation means (not shown) to be fixed with other horizontal straight elements of adjoining arms of the same configuration to define the polygonal rings 9 (see FIGS. 4 and 5).

Said horizontal straight elements 7, 8 of each structural arm 5 further comprising in the upper side respective perforated plates 22 adapted to receive fixation means (not shown) for fixing the structure (not shown) of the packs of media 12 (see FIG. 5).

Referring to FIGS. 3 to 5, the vertical straight elements 6a of the structural arms 5a, that are radially fixed at the outer border collars 4a of the rotor, to define the outer polygonal rings 11 consist of U-shaped profiles defining a vertical channel 23 that will remain facing the vertical channel 16 or 17 of the vertical elements 6 of the intermediate arms 5 which define the intermediate polygonal ring 9, to facilitate the insertion and fastening of the interchangeable packs of media 12.

Said U-shaped profiles of the structural arms 5a that are radially fixed in the outer border collars 4a of the rotor, comprise fixedly at its lower end, two dorsally opposed perforated plates 24, 25 which define a separation between one another embracing the portion of the corresponding border collar 4a whereby fixation means are passed (not shown) to be fixed firmly.

At the upper end of said vertical straight element 6a of the structural arms 5a, is comprised a recess where is fitted and fixed preferably by welding or other attachment means a single horizontal straight element 10, which is formed by sheet elements and U-shaped folded plate, fixed embracing the upper end of the vertical straight element 6a and comprising an end plate 20 with respective holes 21 for receiving fixation means (not shown) to be fixed with other adjoining horizontal straight elements 10 of adjoining arms 5a of the same configuration to define the outer polygonal rings 11 (see FIGS. 4 and 5).

Said horizontal straight elements 10 of each structural arm 5a further comprise on the upper face respective perforated plates 26 adapted to receive fixation means (not shown) for fixing the structure (not shown) of the packs of media 12 (see FIG. 4).

Referring to FIGS. 4 to 7, the plurality of intermediate polygonal rings 9 are distributed equidistant each other throughout the longitudinal section of said cylindrical shaft 2 defining the rotor structure; being adapted two adjoining polygonal rings (in FIG. 5 the outer polygonal ring 11 and an intermediate polygonal ring 9) to receive and fix packs of media or sections 12 consisting of a defined amount of thermoformed polyethylene sheets 13 (see FIG. 5) self-supported with a support structure (not shown) wherein are arranged biofilms, that generate a greater contact and aeration surface for aerobic bacterial proliferation which allow digest the polluting organic load.

Packs of media are radially inserted between each pair of adjoining polygonal rings, by inserting and fixing a package for each structural arm, filling the entire of the rotor frame.

Figure 8:
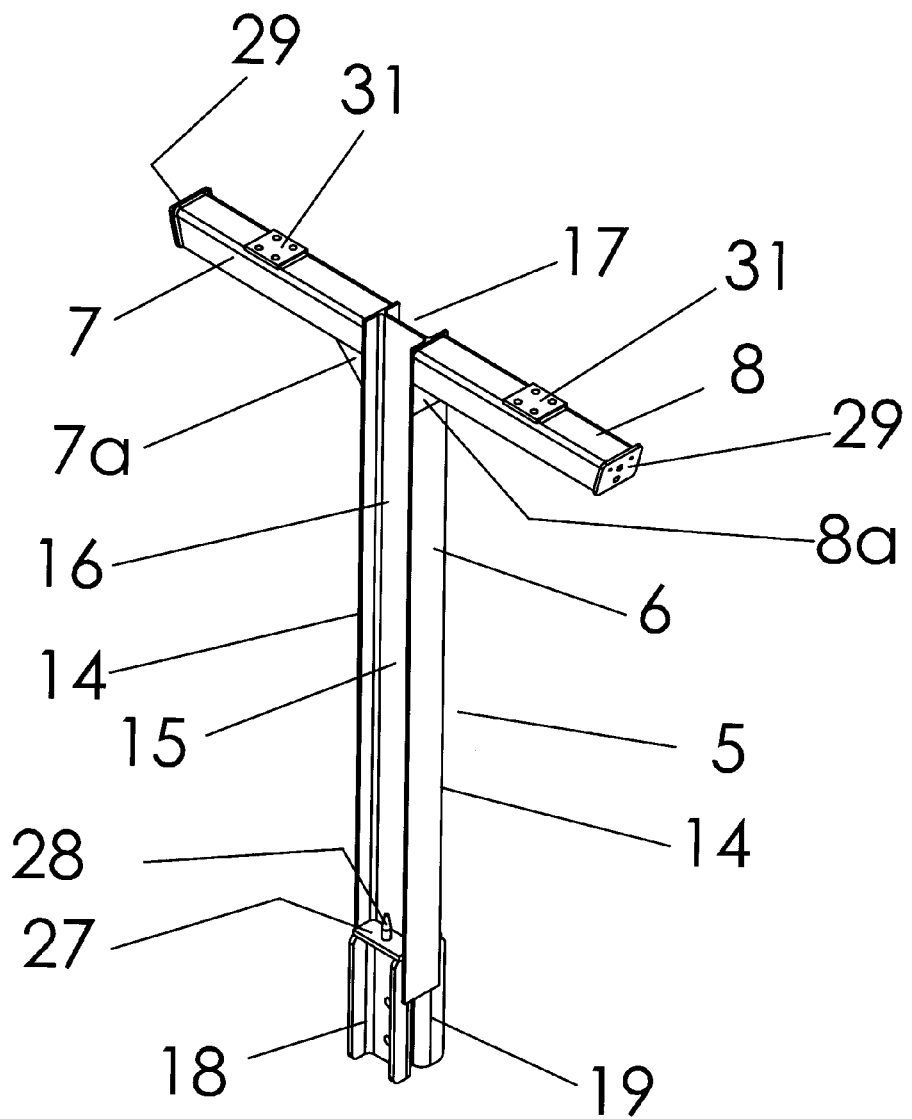
FIG. 8 shows a conventional perspective view of a structural arm in another of its preferred embodiments and can be used both in the intermediate zone and outside of the rotor; as a modular unit for forming polygonal rings of the biological contact rotor frame for aeration in wastewater treatment plant, in accordance with the present invention.
Figure 9:
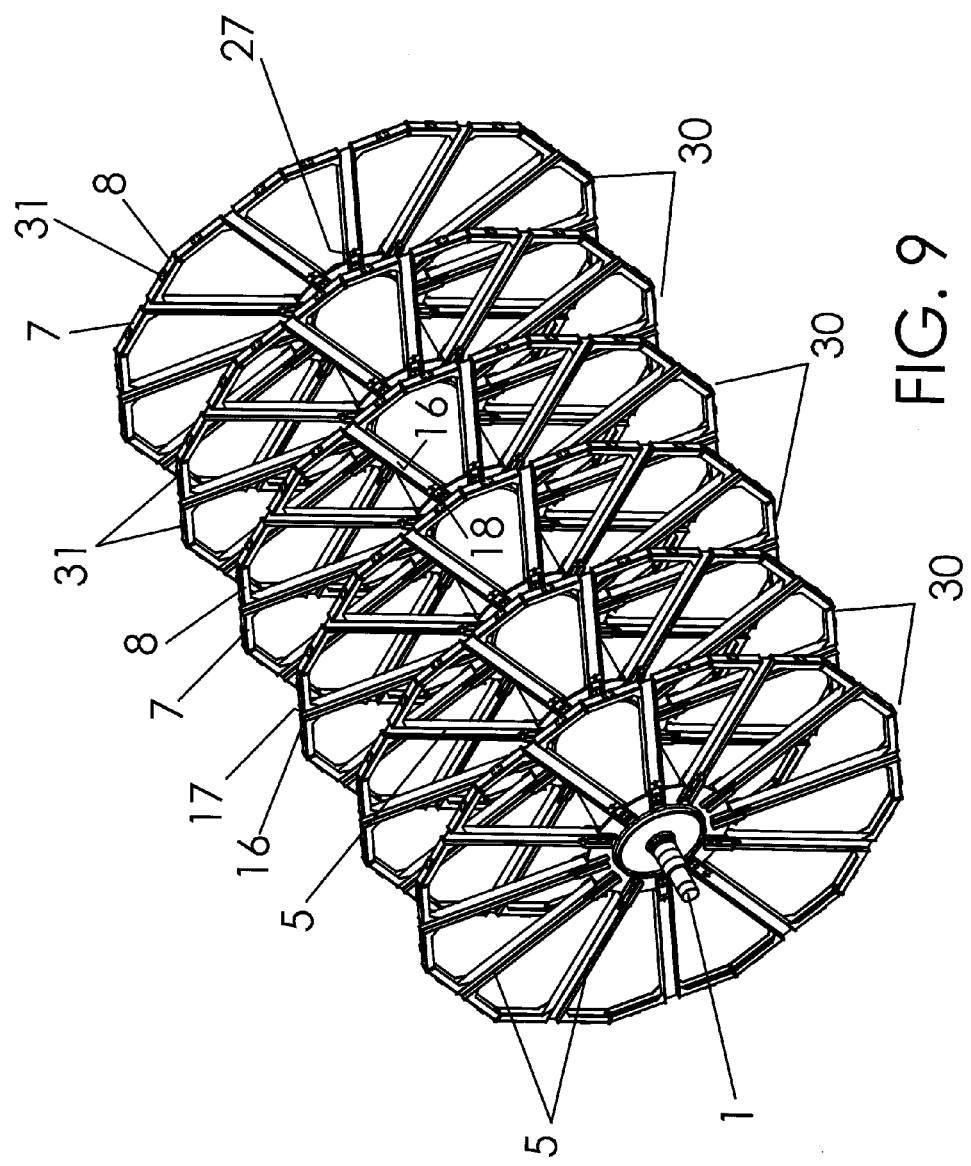
FIG. 9 illustrates a conventional perspective of the biological contact rotor assembled for aeration in wastewater treatment plant, in accordance to FIGS. 1 and 8, using the structural arm of the embodiment shown in said FIG. 8.

Referring to FIGS. 8 and 9, showing another embodiment of the structural arms 5 that can be used both in the intermediate annular collars 4 as in the outer ones 4b (see FIG. 1). Said structural arms 5 have similar configuration as that in FIG. 2, so that the same reference numerals to designate similar parts are used; however differ in that the horizontal straight elements 7 and 8 which are fixed on the upper end of the vertical straight element 6 defining the "T" are quadrangular.

The dorsally opposed fixed plates 18 and 19 at the lower end of the vertical straight element 6 define a separation to embrace a portion of the annular collar 4 or 4a, where these are fixed with various fixation means; a perforated perpendicular plate 27 welded to the plates 18 and 19 with a bolt 28 welded serving as a guide, which is fixed at the lower part of each channel to the limit of the ends of said dorsally opposed fixed plates, to receive attachment means (not shown) to fix the structure of packs of media 12.

Said horizontal straight elements 7 and 8 consist of fixed quadrangular tubular elements in the sides of said vertical straight elements 6, and comprising a high strength plate 29 fixed to the ends of the horizontal straight elements 7 and 8. Said plate 29 is designed with respective holes for water relief and for receive fixation means (not shown) to be fixed with other horizontal straight elements 7 and 8 of adjoining arms of the same configuration to define the polygonal rings 30.

Said horizontal straight elements 7 and 8 of each structural arm 5 further comprise in the upper face, respective perforated plates 31 adapted to receive fixation means to fix the structure of the packs of media (see FIG. 19).

For greater stiffness, are attached two gussets 7a, 8a, one in each side, welding the vertical straight element 6 with the horizontal straight elements 7 and 8.

Referring to FIG. 9, the plurality of adjoining polygonal rings 30 equidistant one from another are distributed throughout the longitudinal section of said cylindrical tube 2 defining the rotor structure; being adapted two adjoining polygonal rings 30 to receive and fix, packs or sections of media 12 (see FIGS. 9, 18 and 19).

Referring to FIGS. 10 to 13 the fixation system of packs of media 12 in this embodiment, for assembling of aeration rotors at wastewater treatment plant, consist of a plurality of biomass supporting sheets 32 (see FIG. 11) of polyethylene, collinearly grouped and partially separated, from one another, comprising ribs 33 on both sides to harden and separating the adjacent sheets; which are self-supported by four galvanized carbon steel tubes or other material with similar properties 34, 35, 36 and 37 that transversally traverse said plurality of biomass support sheets 32 through holes 38; the tubes 34 and 35 being disposed traversing the upper zone of said plurality of biomass supporting sheets 32, and being fixed at their ends in a zone next to the ends of a horizontal straight arm 39 of two T-shaped structural elements 40, and the tubes 36 and 37 being disposed traversing the central zone and the lower zone of said plurality of biomass support sheets 32, being fixed at their ends in the central zone and lower zone of a vertical straight arm 41 of the T-shaped structural elements 40.

Said T-shaped structural elements 40, externally embrace the group of biomass support sheets 32 defining together a pack of media 12 which can be installed and fixed through said T-shaped structural elements 40 between one pair of adjoining structural rings of the frame of a biological contact rotor.

Said horizontal straight arms 39 and said vertical straight arms 41 that form the T-shaped structural elements 40 in this embodiment, are preferably manufactured of carbon steel sheet or other material of similar properties through processes such as punching, stamping and bending, in the form of "U" to provide greater rigidity and strength.

Said horizontal straight arm 39 of said T-shaped structural elements 40 having a shape of "U", comprise at each end, a perpendicular end plate 42 with a hole 43 to receive attachment means (not shown) to be fixed with the end of another horizontal straight arm 39 from other adjoining structural element and by joining a plurality of T-shaped structural elements 40 define a disc of media.

Said horizontal straight arm 39 of said T-shaped structural elements 40 having a shape of "U", are horizontally disposed, defining a transverse longitudinal channel defining a upper flange 44 and a lower flange 45 which comprises respective holes 46 adapted for receiving fixation means (not shown) to be fixed in the structural rings of an frame of a biological contact rotor (not shown).

Said vertical straight arm 41 of said T-shaped structural elements 40 having a shape of "U", comprise at its lower end a perpendicular end plate 47 with a hole 48 for receiving an attachment means (not shown) to be fixed in radial structural arms of the frame of a biological contact rotor (not shown).

Figure 12:
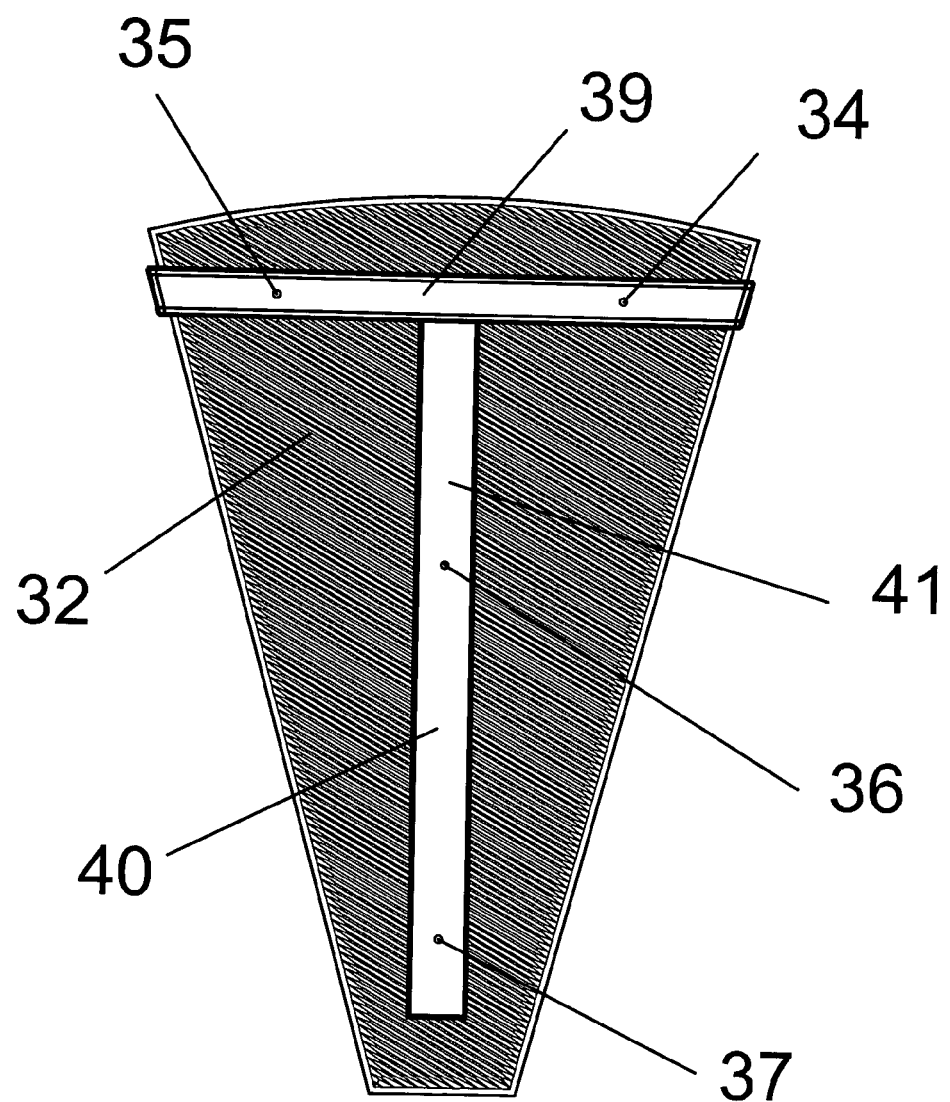
FIG. 12 shows a front view of a pack of media defined by the fixation system for assembly of the aeration rotor in wastewater treatment plant, in accordance with FIGS. 10 and 11.

Referring to FIG. 12, there is shown a front view of a pack of media defined by the fixation system for assembling of the aeration rotor at wastewater treatment plant in accordance with the present invention. In said figure is shown one of the T-shaped structural elements 40 embracing the plurality of biomass support sheets 32 with galvanized carbon steel tubes 34, 35, 36 and 37 that transversally traverse said plurality of biomass support sheets 32 through corresponding holes that are fixed in said horizontal straight arm 39 and said vertical straight arm 41, defining a pack of media 12.

Figure 10:
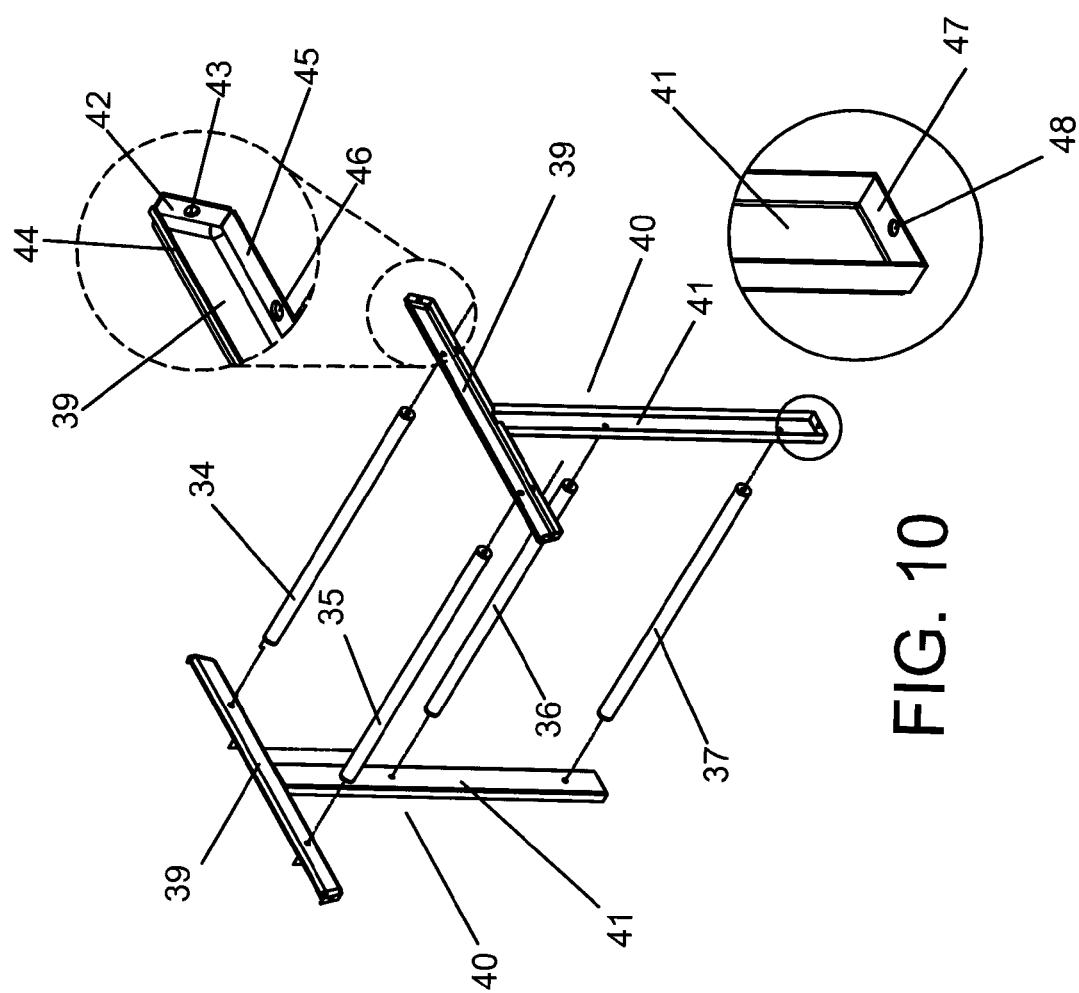
FIG. 10 shows an exploded view of the fixation system of packs of media for assembly of the aeration rotor in wastewater treatment plant, in one embodiment of fixing the tubes that traverse the biomass support sheets.
Figure 11:
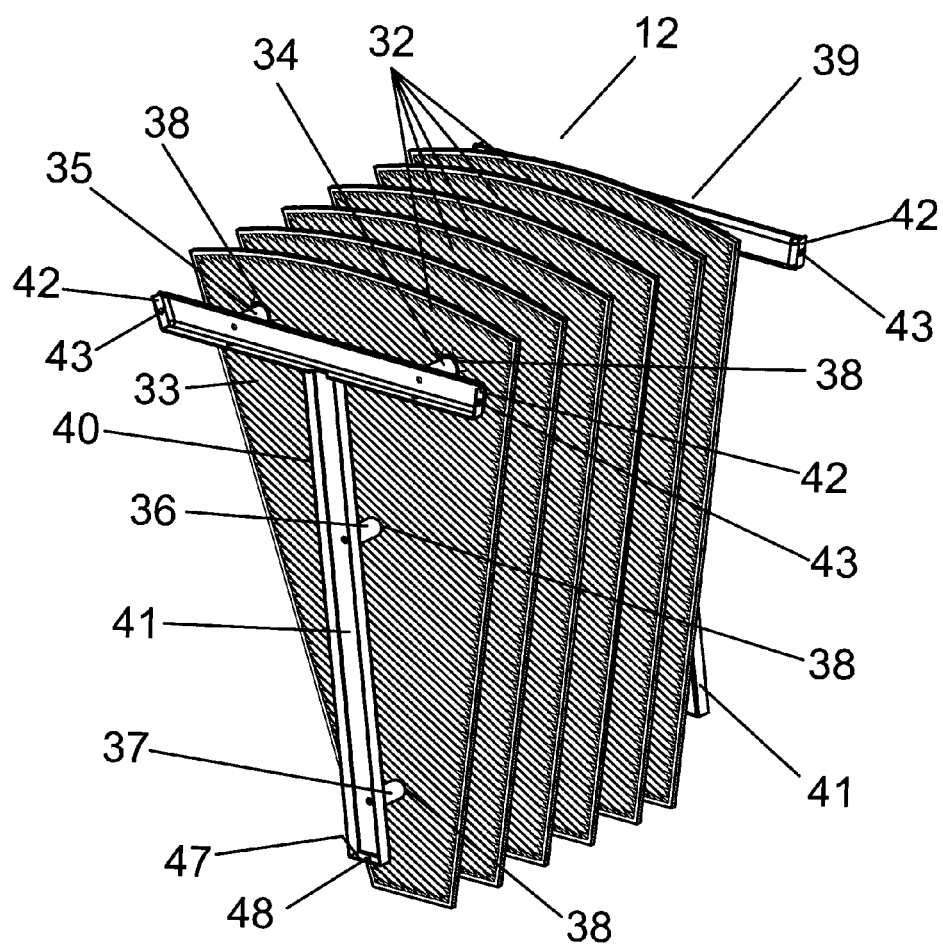
FIG. 11 shows a conventional perspective view of a pack of media defined by the fixation system for assembly of the aeration rotor in wastewater treatment plant, in accordance with FIG. 10.
Figure 13:
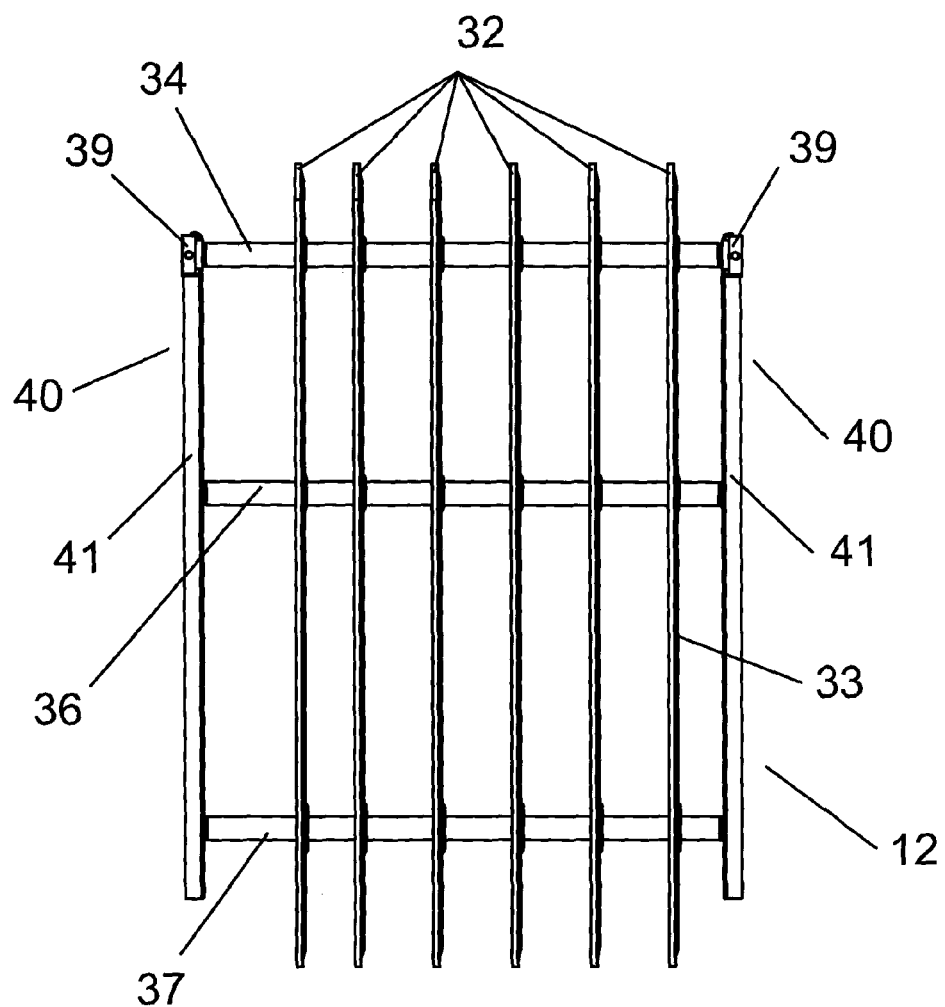
FIG. 13 shows a side view of a pack of media defined by the fixation system for assembly of the aeration rotor in wastewater treatment plant, in accordance with FIGS. 10 and 12.

In FIG. 13 a side view of a pack of media 12 is shown, defined by the fixation system for assembling of aeration rotor at wastewater treatment plant in accordance with the present invention; showing the elements already described in FIGS. 10 to 12; the separation of the plurality of biomass support sheets 32 is merely illustrative; it can be narrower or even, the sheets may be in contact each other, wherein the ribs 33 (see FIG. 11) allow the generation of spaces for aeration.

Figure 14:
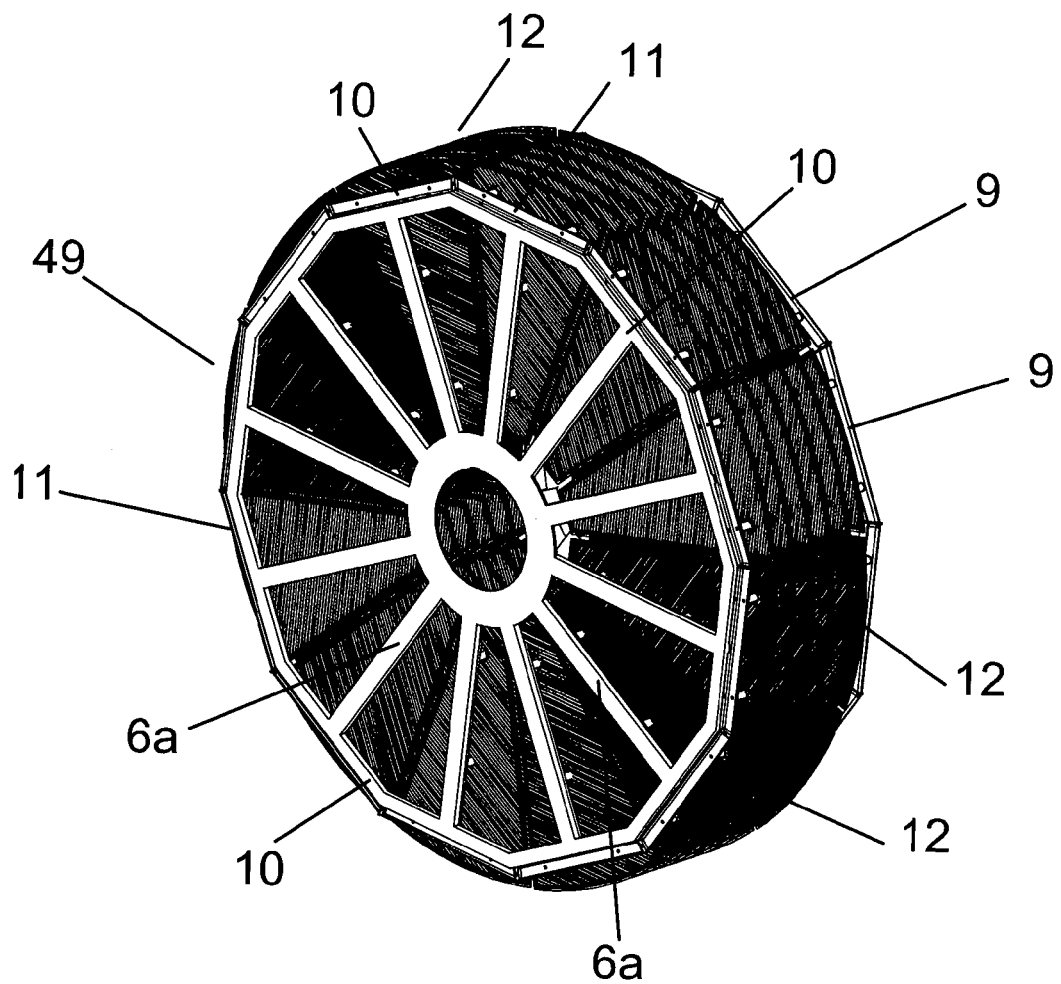
FIG. 14 shows a conventional perspective view of a plurality of packs of media bonded together and bonded to a pair of structural rings of the frame of a cylinder defining a disc of media, in accordance with FIGS. 10 to 13.

In FIG. 14 is shown a conventional perspective of a plurality of packs of media 12 joined each other and attached to a pair of structural rings 11 and 9 (FIGS. 4 and 5) of the frame of a rotor defining a disc of media 49; said plurality of packs of media remain radially disposed; wherein the horizontal straight arms 10, 7 and 8 of each T-shaped structural element are fixed in the perimeter ring 11, 9 of the frame of the rotor and the end of the vertical straight arm (not shown) is fixed at the lower part of the radial structural arms 6, 6a of each polygonal ring 9, 11 of the rotor frame.

Referring to FIGS. 15 and 16, there is shown an exploded view and an assembled perspective of the assembly structure of a pack of media for the biological contact rotor, for aeration at wastewater treatment plant, in accordance with the present invention. In said figures, the packs of media 12 are configured as shown and described in FIGS. 10 and 12 and therefore the same reference numerals to designate the same parts are used; in this embodiment the fixation of the tubes 34, 35, 36 and 37, at the union with the T-shaped structural element 40 is carry out using a self-locking triangular washer 50 cal 10, holding the nut fixed, preventing movement in the structure, providing greater strength to the pack of media.

Said pair of T-shaped structural elements 40, externally embraces the group of biomass support sheets 32, defining together a pack of media 12.

Said horizontal 39, and vertical 41, straight arms, that form the T-shaped structural elements 40 that externally embrace the group of biomass support sheets 32, and defining together a pack of media 12, are preferably made in carbon steel sheet or other material of similar properties by processes such as punching, stamping and bending, in the form of "U" that provide greater rigidity and strength.

Said horizontal straight arm 39 of said T-shaped structural element 40, is straight U-shaped, and in each end comprises a welded plate of greater strength at the perpendicular end 42 perforated for receiving attachment means to be fixed with the end of another horizontal straight arm 39 from other adjoining structural element and by joining, a plurality of T-shaped structural elements 40 define a disc of media.

Said horizontal straight arm 39 of said T-shaped structural elements 40 is arranged horizontally defining a traverse longitudinal channel defining an upper flange 44 and a lower flange 45 comprising respective holes adapted to receive fixation means to be fixed on the perforated plates 31 of said horizontal straight elements 7 and 8 from each structural arm 5 (see FIG. 8).

Said vertical straight arm 41 of said T-shaped structural elements 40 of the packs of media 12 comprises at its lower end a perpendicular perforated end plate 47 with a stainless steel ferrule 51, which also may be of a resistant plastic material, or other material with properties similar to any of the mentioned, self-lubricated and not subject to corrosion (see FIG. 15) which serves to receive attachment means to be fixed to said perpendicular perforated plate 27 fixed at the bottom of each structural arm 5 of the rotor structure (see FIG. 8).

Referring to FIGS. 17 to 17D, said carbon steel tubes (34, 35, 36 or 37) coated to protect them against corrosion or from other material of similar properties, that transversally traverse said plurality of biomass support sheets 32 (see FIG. 16) through holes, are hollow tubes which internally house a volume of air and which are obturated at both ends by steel plugs 52 machined with one or more threaded blind bore(s) 53 normally of 1.5875 cm (⅝") diameter, 18-UNF.

These plugs 52 are attached to the ends of the tubes 34, 35, 36 or 37 by electric arc welding, and subsequently the welding is ground to give a polished finish. The finished part prevents water leakage into the tubes, avoiding that the corrosion process by concentration in cells, generates a shorter lifetime of the part. This method of obturating with plugs at the ends of the tube allows when rotating the rotor, the buoyancy force that occurs is equal to the displaced volume of air inside the tubes by the wastewater density.

The plugs 52 have the function of sealing the tube ends 34, 35, 36 or 37 to ensure no leakage of water into the tube and the oxidation process is accelerated in the internal walls of the tube. The plug has a bevel 54 of 2.38 mm of 45° like the tube ends, so that at the moment of the mounting the plugs 52 and the ends of the tube 34, 35, 36 or 37 forms a V-shaped groove, 55 of 90°, which favors greater penetration of the filling material and better bond between the tube and plug. Said one or more, threaded blind bore(s) 53 have a blind bore type unique design to prevent the water entry, which functioning as a guide, allows easy assembly and prevents that the plug scratches the internal wall of the tube 34, 35, 36 or 37. Said one or more threaded blind bore(s) 53 normally of 1.5875 cm (⅝") diameter, 18 UNF, enabling the reinforcement in the "T" of the sheets. These blind hole(s) 53 are adapted to receive fixation means (not shown) that fix the tubes to the corresponding, horizontal 39 and vertical 41 straight arms of said T-shaped structural elements 40 (see FIGS. 15 and 16) that outwardly embrace the group of biomass support sheets 32, defining together a pack of media 12.

Referring to FIG. 18 which shows a conventional perspective of a pair of polygonal rings 30 of the biological contact rotor, wherein the packs of media 12 are inserted, the opposed vertical channels 16 and 17, of said T-shaped structural arms 5, radially distributed in each annular collar 4 (see FIG. 1), serve as a guide for sliding the corresponding vertical straight arms 41 of the T-shaped structural elements 40, that outwardly embrace the group of biomass support sheets 32, defining together a pack of media, so that the assembling is fast, efficient and strong in multiple points.

Referring to FIG. 19 and with support on FIG. 18, it is seen that the packs of media 12 are fixed as follows: The lower flange 45 which comprises respective holes 46 (not shown in this view) of said horizontal straight arm 39, of said T-shaped structural elements 40, is fixed with attachment means to the perforated plate 31 of said horizontal straight elements 7 and 8 of each structural arm 5; furthermore the perpendicular perforated end plate 47 that integrates a stainless steel ferrule 51, which may also be of a resistant plastic material, or other material of similar properties to any of the above mentioned, self-lubricated, and not subject to corrosion in said vertical straight arm 41 of said T-shaped structural elements 40 of the packs of media 12, receive attachment means to be fixed in said perpendicular perforated plate 27 fixed in the lower part of each structural arm 5 of the rotor structure.

Referring to FIGS. 20 and 21, the assembled rotor frame, in the absence of biomass support sheets of the packs of media, for better illustration, shows at the ends of each T-shaped structural element, a high strength plate 56 serving for the resistant bond between the ends of the same (T).

In said figures are illustrated some numerical references already described and explained in the description of the previous figures.

In the embodiment shown, said high strength plates 56 are fixed to the side ends of the T-shaped structural element, with the purpose of reducing stresses in the media structure.

The invention has been sufficiently described so that a person of ordinary skill in the art may reproduce and obtain the results mentioned in the present invention. However, any person with skill in the field of art to which the present invention pertains, may be able to make modifications not described in the present application, however, if for the implementation of these modifications in a particular structure or in the manufacturing process of the same, it is required the claimed matter in the following claims, such structures will be comprised within the scope of the invention.

What is claimed is:

1. A high capacity biological contact rotor, comprising a drive shaft with supports affixed at both ends for engagement with a drive motor; a cylindrical tube having a diameter greater than said drive shaft and further having end supports to situate said high capacity biological contact rotor in a wastewater treatment tank and/or to couple said high capacity biological rotor to a drive motor wherein said drive shaft is housed within said cylindrical tube; a plurality of intermediate annular collars and two end annular collars wherein said intermediate annular collars and said end annular collars are spaced at equal intervals on said cylindrical tube, said intermediate annular collars and said end annular collars are adapted to fixedly receive a plurality of structural arms radially distributed thereon and each intermediate annular collar and each end annular collar has affixed thereto at least one structural arm, and said structural arms are substantially T-shaped formed from a structural IPR steel beam formed by two skids having an inner and outer side attached to the center by a web defining two opposite vertical channels wherein the edges of the structural IPR steel beams are folded inwards creating a vertical, elongated U-shaped vertical straight element having a lower end which is attached to an annular collar and attached at the upper end of said vertical straight element at least one horizontal straight element having an upper and a lower surface defining the "T"; wherein each end of said horizontal straight element of each arm is adapted to be joined to the end of the horizontal straight element of an adjoining structural arm, wherein when said ends of said horizontal straight elements of adjoining structural arms are joined to one another, a structural polygonal ring is formed about each annular collar supported by the plurality of U-shaped vertical straight elements, provided that two adjoining polygonal rings are situated about the cylindrical tube in such a manner so as to receive and fix in place packs or sections of media consisting of a defined amount of a plurality of collinearly grouped and partially spaced thermoformed biomass supporting sheets cut into a wedge shape and having one or more pins or bolts affixed thereto wherein said sheets are situated in such a manner as to expose both sides of said sheets to said wastewater in said treatment tank, wherein biofilms are disposed, generating a contact and aeration surface for the proliferation of aerobic bacteria that digest an organic pollutant load, further wherein said packs or sections of media have a tapered, thin edge and an opposing, comparatively thicker edge; and further wherein said packs or sections of media are not affixed to said structural arms of said high capacity biological contact rotor prior to assembly of said high capacity biological contact rotor.

2. The high capacity biological contact rotor according to claim 1, wherein said opposed vertical channels of the vertical straight elements of opposite structural arms of said adjoining polygonal rings, serve as a guide to slide and engage packs or sections of media within the space created by the inwardly folded edges of the structural IPR steel beams.

3. The high capacity biological rotor according to claim 2, wherein said vertical straight element of said structural arm, radially distributed and fixed to said intermediate annular collars and said end annular collars, comprises at the lower end, a pair of dorsally opposed fixed plates in said web of the vertical straight element which define a space at the lower end of said vertical straight element that embraces a portion of the annular collar so as to secure said pair of dorsally opposed fixed plates of said vertical straight element to an annular collar.

4. The high capacity biological contact rotor according to claim 3, wherein said vertical element of the structural arms comprises, at the upper end, two horizontal straight elements, edgewise fixed on the outer side of one of the skids, comprising sheet elements and a U-shaped folded plate that comprises, at both ends, a plate having holes capable of receiving a pin or bolt to join said plate with a plate situated at the corresponding end of a horizontal straight element of an adjoining structural arm; further comprising on the upper surface of said horizontal straight element one or more perforated plates also capable of receiving one or more pins or bolts affixed to the packs of media wherein when said one or pins or bolts affixed to the packs of media engage said perforated plates, said packs are secured to said vertical element.

5. The high capacity biological contact rotor according to claim 4, wherein said vertical structural arms are radially fixed to the intermediate and end annular collars.

6. The high capacity biological contact rotor according to claim 1, wherein said U-shaped vertical straight element of a structural arm of said plurality of arms defines a vertical channel; further wherein said U-shaped vertical straight element is disposed inwardly facing a corresponding vertical channel of a U-shaped vertical element of an opposing structural arm of an opposing structural polygonal ring; further wherein said U-shaped vertical straight elements have two dorsally opposed perforated plates affixed to the lower end of said U-shaped vertical straight element defining a separation for embracing a portion of the annular collar in which to firmly affix said U-shaped vertical straight elements to an annular collar.

7. The high capacity biological contact rotor according to claim 1, wherein the upper end of said vertical straight element defined by the U-shaped profiles of the structural arms comprises a recess where it is fitted and fixed by welding or other attachment means a single horizontal straight element defining the shape of "T" that is formed by sheet elements and U-shaped folded plate, fixed embracing the upper end of the vertical straight element, with an end plate with respective holes for receiving fixation means to be fixed with other adjoining horizontal straight elements to define outer polygonal rings.

8. The high capacity biological contact rotor according to claim 7, wherein said horizontal straight elements of each structural arm of the outer structural polygonal rings, further comprise perforated plates affixed to the upper surface of said horizontal straight elements adapted to receive fixation means to secure the packs of media in the space between adjoining structural polygonal rings.

9. The high capacity biological contact rotor according to claim 8, wherein said vertical straight element of the structural arms of the intermediate annular collars and the two end annular collars defining the structural polygonal rings, comprises at least one inverted ribbed body, laterally affixed below the horizontal straight element of the structural arm, diagonally projected towards the lower end, with respective holes adapted to receive fixation means to affix the packs of media securely to two adjacent structural polygonal rings; further wherein said inverted ribbed body provide support to stabilize the structure when the packs of media are inserted into the space between two adjacent structural polygonal rings.

10. The high capacity biological contact rotor according to claim 9, wherein the packs of media are radially inserted between each pair of adjoining polygonal rings; inserting said packs of media so that the tapered, thin edge is flush with the annular collar and the side of the thicker portion of the media pack is flush with the upper side of the horizontal straight element and affixing said media pack for each structural arm.

11. The high capacity biological contact rotor according to claim 1, wherein said horizontal straight elements defining the T-shaped structural arms are tubular or quadrangular in shape and are fixed to the sides of the upper end of said vertical straight elements, and further wherein said horizontal straight elements are comprised of a high strength plate fixed at the ends of the horizontal straight elements; wherein said plate is designed with respective holes to release water and to receive fixation means of other horizontal straight elements of adjoining arms of the same configuration so as to join one horizontal straight element to a neighboring straight element to form the polygonal rings; said horizontal straight elements of each structural arm further comprise on the top surface thereof a perforated plate adapted to receive fixation means to secure packs of media to the structural polygonal rings of the rotor; wherein said rotor further comprises two gussets fixedly attached at the juncture of the horizontal straight element and the vertical straight element; and further comprising two dorsally opposed fixed plates affixed to the lower end of the vertical straight element wherein said dorsally opposed fixed plates create a space in which to affix said plates to an annular collar; further comprising a perforated perpendicular plate welded to said dorsally opposed fixed plates having a welded vertical bolt that serves as a guide to receive an attachment means to secure said packs or sections of media between adjacent structural polygonal rings.

12. The high capacity biological contact rotor according to claim 11, wherein said packs or sections of media installed in said high capacity biological contact rotor comprise a plurality of biomass supporting sheets, wherein said biomass supporting sheets are collinearly grouped and spaced apart from each other; further wherein said biomass supporting sheets have ribs and/or grooves on one or both sides wherein the ribs and/or groves of opposing supporting sheets separate adjacent supporting sheets; further wherein said biomass support sheets are self-supported by a plurality of transverse support and fixation elements that penetrate said plurality of biomass supporting sheets through holes made in said biomass supporting sheets using 10 mm caliber, self-locking, triangular washers joined at both ends into two T-shaped structural elements comprising a vertical straight arm having an upper end and a lower end and a horizontal straight arm; provided said packs or sections of media are designed so as to be capable of being installed within the space between to structural polygonal rings and being affixed thereto to said adjacent structural polygonal rings using said T-shaped structural elements.

13. The high capacity biological contact rotor according to claim 12, wherein said rotor media pack's T-shaped structural elements comprise at least one horizontal straight arm centrally affixed to the upper end of a vertical straight arm; wherein said vertical straight arm has a U-shaped profile; further wherein said horizontal straight arm defines an upper flange and a lower flange, said lower flange having holes distributed through capable of receiving pins and/or bolts to secure the media pack to the structural polygonal rings; wherein said horizontal straight arm comprises a perpendicular plate at each end having a hole to receive attachment means to be joined to a corresponding plate affixed to the end of an adjoining horizontal straight arm and by joining a plurality of T-shaped structural elements to form a disc of media.

14. The high capacity biological contact rotor according to claim 12, wherein said T-shaped structural elements of said packs or sections of media is are adapted to be laterally affixed to other T-shaped structural elements of adjoining packs or sections of media to form a disc of media, and further comprising means to affix said media disc to the radial structural arms of the structural polygonal rings when all of said packs or sections of media are affixed to each other to form said disc prior to installation of said disc on said rotor.

15. The high capacity biological contact rotor according to claim 14, wherein said vertical straight element of each of said T-shaped structural element of said packs or sections of media comprises a perpendicular end plate having a hole to receive an attachment means securing said perpendicular end plate to the lower end of the radial T-shaped structural arm of the biological contact rotor frame, wherein said high capacity biological contact rotor further comprises a ferrule comprised of a material selected from the group consisting of stainless steel, corrosion-resistant plastic, or other self-lubricating, corrosion-resistant material.

16. The high capacity biological contact rotor according to claim 15, wherein said plurality of transverse support and fixation elements traversing the plurality of biomass support sheets are selected from the group consisting of tubes, pins, rods, bars and galvanized carbon steel tubes.

17. The high capacity biological contact rotor according to claim 16, wherein said support and fixation elements traversing the plurality of biomass support sheets that form the packs or sections of media, are used in a preferred number of four for each pack or section of media, wherein two of said support and fixation elements traverse the upper area of plurality of biomass support sheets forming two of the four media packs or sections and affixing close to the ends of the horizontal straight element of the T-shaped structural element, and the other two support and fixation elements traversing the central and the lower portions of said plurality of biomass support sheets that form the packs or sections of media affixing to the central and lower sections of the vertical straight element of the T-shaped structural element.

18. The high capacity biological contact rotor according to claim 17, wherein said thermoformed biomass supporting sheets are comprised of high density polyethylene or polypropylene or a combination thereof.

19. The high capacity biological contact rotor according to claim 16, wherein said transverse support and fixation elements are hollow tubes filled with air and obturated at both ends with a plug having one or more threaded blind bores capable of receiving a fixation means attached to a T-shaped structural element wherein said internal air exerts a buoyancy force when said rotor rotates; and wherein said high capacity biological contact rotor further comprises a plurality of stress resistant attachment elements comprising high strength plates welded to the ends of the support and fixation element and further comprising clamping means.

20. The high capacity biological contact rotor according to claim 19, wherein said vertical straight arm of said T-shaped structural element of said media pack, comprises a perpendicular end plate affixed to the lower end of said vertical straight arm wherein said perpendicular end plate having a hole to receive an attachment means for securing said perforated perpendicular plate to the lower part of said vertical channel of said vertical straight elements of said vertical straight arm of said T-shaped structural element of said media pack.

21. The high capacity biological contact rotor according to claim 6, wherein said vertical channels of the U-shaped vertical straight elements of opposing T-shaped structural arms of said adjoining structural polygonal rings, are configured to accept and secure to two corresponding structural polygonal rings, the corresponding vertical straight arms of the T-shaped structural elements affixed to the opposing sides of a media pack.

22. The high capacity biological contact rotor according to claim 19, wherein said plugs and said tube have a bevel of 2.38 mm at 45° provided that after said plugs are affixed to the ends of said tube, said plugs and the ends of said tube form a 90° V-shaped groove.

23. The high capacity biological contact rotor according to claim 19, wherein said plugs are electric arc welded to the ends of said tube and further wherein after said plugs are welded to said tube said tube is subsequently buffed to a polished finish.

24. The high capacity biological contact rotor according to claim 1, wherein said high capacity biological contact rotor has 45,000 $m^2$ of media contact surface per high capacity biological contact rotor.

25. The high capacity biological contact rotor according to claim 1, wherein said packs or sections of media are radially inserted and affixed to every corresponding structural arms of each pair of adjoining polygonal rings.

26. The high capacity biological contact rotor according to claim 1, wherein said high capacity biological contact rotor has a diameter between 4.5 and 5.5 m.

* * * * *